United States Patent
Sugio et al.

(10) Patent No.: US 10,404,998 B2
(45) Date of Patent: Sep. 3, 2019

(54) MOVING PICTURE CODING METHOD, MOVING PICTURE CODING APPARATUS, MOVING PICTURE DECODING METHOD, AND MOVING PICTURE DECODING APPARATUS

(75) Inventors: Toshiyasu Sugio, Osaka (JP); Takahiro Nishi, Nara (JP); Youji Shibahara, Osaka (JP); Hisao Sasai, Osaka (JP)

(73) Assignee: SUN PATENT TRUST, New York, NY (US)

( * ) Notice: Subject to any disclaimer, the term of this patent is extended or adjusted under 35 U.S.C. 154(b) by 599 days.

(21) Appl. No.: 13/985,315

(22) PCT Filed: Feb. 17, 2012

(86) PCT No.: PCT/JP2012/001052
§ 371 (c)(1),
(2), (4) Date: Aug. 14, 2013

(87) PCT Pub. No.: WO2012/114694
PCT Pub. Date: Aug. 30, 2012

(65) Prior Publication Data
US 2013/0322543 A1    Dec. 5, 2013

(51) Int. Cl.
*H04N 7/36* (2006.01)
*H04N 19/56* (2014.01)
(Continued)

(52) U.S. Cl.
CPC ............. *H04N 19/56* (2014.11); *H04N 19/51* (2014.11); *H04N 19/513* (2014.11)

(58) Field of Classification Search
CPC .... H04N 19/513; H04N 19/52; H04N 19/176; H04N 19/61; H04N 19/51; H04N 19/577;
(Continued)

(56) References Cited

U.S. PATENT DOCUMENTS 6,611,559 B1   8/2003   Shingo et al.
6,690,724 B1   2/2004   Kadono
(Continued)

FOREIGN PATENT DOCUMENTS

CN   1525762    9/2004
EP   1 411 729   4/2004
(Continued)

OTHER PUBLICATIONS

Guillaume Laroche et al., "RD Optimized Coding for Motion Vector Predictor Selection", IEEE Transactions on Circuits and Systems for Video Technology, vol. 18, No. 9, Sep. 1, 2008, pp. 1247-1257, XP011231739.
(Continued)

*Primary Examiner* — Dave Czekaj
*Assistant Examiner* — Kehinde Abimbola
(74) *Attorney, Agent, or Firm* — Wenderoth, Lind & Ponack, L.L.P.

(57) ABSTRACT

A moving picture coding method includes: determining whether or not a first block has two reference motion vectors for referencing a same direction that is one of a forward direction and a backward direction in display order, the first block being included in a first picture different from the current picture and being co-located, in the first picture, with the current block within the current picture; and calculating, when it is determined in the determining that the first block has the two reference motion vectors, first and second motion vector predictor candidates that are candidates for a motion vector for the current block, by scaling the two reference motion vectors.

12 Claims, 41 Drawing Sheets

(51) Int. Cl.
*H04N 19/51* (2014.01)
*H04N 19/513* (2014.01)

(58) Field of Classification Search
CPC .... H04N 19/137; H04N 19/105; H04N 19/56;
H04N 19/172; H04N 19/573; H04N
19/139; H04N 19/159; H04N 19/182;
H04N 19/184; H04N 19/70; H04N
19/124; H04N 19/46; H04N 19/44; H04N
19/174; H04N 19/503
See application file for complete search history.

(56) References Cited

U.S. PATENT DOCUMENTS

| | | | |
|---|---|---|---|
| 7,233,621 B2 | 6/2007 | Jeon | |
| 7,733,960 B2 | 6/2010 | Kondo et al. | |
| 7,782,936 B2 | 8/2010 | Kondo et al. | |
| 7,894,526 B2* | 2/2011 | Kadono | H04N 21/41422 375/240.16 |
| 7,970,058 B2 | 6/2011 | Suzuki | |
| 8,345,758 B2* | 1/2013 | Jeon | H04N 19/521 375/240.15 |
| 8,462,852 B2* | 6/2013 | Xu | H04N 5/144 375/240.16 |
| 8,463,058 B2* | 6/2013 | Jeon | H04N 19/56 382/236 |
| 8,537,897 B2* | 9/2013 | Lee | H04N 19/52 375/240.01 |
| 8,630,348 B2* | 1/2014 | Jeon | H04N 19/117 375/240.16 |
| 8,929,453 B2* | 1/2015 | Kondo | H04N 19/105 348/699 |
| 8,958,480 B2* | 2/2015 | Kondo | H04N 19/105 348/699 |
| 8,964,848 B2* | 2/2015 | Kondo | H04N 19/105 348/699 |
| 9,008,181 B2* | 4/2015 | Chen | H04N 19/159 375/240.15 |
| 2002/0181579 A1 | 12/2002 | Vetro et al. | |
| 2003/0215014 A1 | 11/2003 | Koto et al. | |
| 2004/0008784 A1* | 1/2004 | Kikuchi | H04N 19/573 375/240.16 |
| 2004/0017851 A1 | 1/2004 | Haskell et al. | |
| 2004/0052507 A1* | 3/2004 | Kondo | H04N 19/50 386/329 |
| 2004/0057518 A1 | 3/2004 | Knee et al. | |
| 2004/0066848 A1 | 4/2004 | Jeon | |
| 2004/0086044 A1* | 5/2004 | Kondo | H04N 19/105 375/240.13 |
| 2004/0136461 A1* | 7/2004 | Kondo | H04N 19/105 375/240.16 |
| 2004/0146109 A1* | 7/2004 | Kondo | H04N 19/105 375/240.16 |
| 2004/0146110 A1 | 7/2004 | Bjontegaard | |
| 2004/0190615 A1 | 9/2004 | Abe et al. | |
| 2004/0218674 A1 | 11/2004 | Kondo et al. | |
| 2004/0233988 A1* | 11/2004 | Kadono | G06F 1/03 375/240.16 |
| 2004/0234143 A1 | 11/2004 | Hagai et al. | |
| 2004/0268266 A1 | 12/2004 | Slotznick et al. | |
| 2005/0013497 A1 | 1/2005 | Hsu et al. | |
| 2005/0053147 A1 | 3/2005 | Mukerjee et al. | |
| 2005/0129125 A1 | 6/2005 | Cha et al. | |
| 2005/0141612 A1 | 6/2005 | Abe et al. | |
| 2005/0152452 A1* | 7/2005 | Suzuki | H04N 19/176 375/240.16 |
| 2005/0185713 A1 | 8/2005 | Winger et al. | |
| 2006/0153300 A1 | 7/2006 | Wang et al. | |
| 2006/0198445 A1 | 9/2006 | Li et al. | |
| 2007/0025444 A1 | 2/2007 | Okada et al. | |
| 2007/0036218 A1* | 2/2007 | Burazerovic | H04N 19/51 375/240.16 |
| 2007/0071107 A1 | 3/2007 | Ha | |
| 2007/0104379 A1 | 5/2007 | Kim et al. | |
| 2007/0110156 A1 | 5/2007 | Ji et al. | |
| 2007/0183499 A1 | 8/2007 | Kimata et al. | |
| 2007/0211802 A1 | 9/2007 | Kikuchi et al. | |
| 2008/0037636 A1* | 2/2008 | Jeon | H04N 19/56 375/240.12 |
| 2008/0037646 A1* | 2/2008 | Jeon | H04N 19/56 375/240.16 |
| 2008/0063060 A1* | 3/2008 | Kondo | H04N 19/105 375/240.13 |
| 2008/0063061 A1* | 3/2008 | Kondo | H04N 19/105 375/240.13 |
| 2008/0063071 A1* | 3/2008 | Suzuki | H04N 19/176 375/240.16 |
| 2008/0063072 A1* | 3/2008 | Suzuki | H04N 19/176 375/240.16 |
| 2008/0063075 A1* | 3/2008 | Kondo | H04N 19/105 375/240.16 |
| 2008/0069225 A1* | 3/2008 | Suzuki | H04N 19/176 375/240.16 |
| 2008/0069231 A1* | 3/2008 | Kondo | H04N 19/105 375/240.16 |
| 2008/0069232 A1* | 3/2008 | Kondo | H04N 19/105 375/240.16 |
| 2008/0075171 A1* | 3/2008 | Suzuki | H04N 19/176 375/240.16 |
| 2008/0117979 A1 | 5/2008 | Kondo et al. | |
| 2008/0240247 A1 | 10/2008 | Lee et al. | |
| 2008/0267292 A1 | 10/2008 | Ito et al. | |
| 2009/0041124 A1 | 2/2009 | Ohgose | |
| 2009/0059068 A1 | 3/2009 | Hanaoka et al. | |
| 2009/0074069 A1 | 3/2009 | Jeon | |
| 2009/0110075 A1 | 4/2009 | Chen et al. | |
| 2009/0116759 A1 | 5/2009 | Suzuki et al. | |
| 2009/0190660 A1 | 7/2009 | Kusakabe et al. | |
| 2009/0207914 A1 | 8/2009 | Choi et al. | |
| 2009/0290642 A1 | 11/2009 | Ohgose | |
| 2010/0195723 A1* | 8/2010 | Ikai | H04N 19/197 375/240.12 |
| 2010/0202539 A1* | 8/2010 | Kondo | H04N 19/105 375/240.16 |
| 2010/0208817 A1 | 8/2010 | Jeon et al. | |
| 2010/0223239 A1 | 9/2010 | Madsen et al. | |
| 2010/0316127 A1 | 12/2010 | Yokoyama | |
| 2011/0002389 A1* | 1/2011 | Xu | H04N 19/61 375/240.16 |
| 2011/0038420 A1* | 2/2011 | Lee | H04N 19/52 375/240.16 |
| 2011/0080954 A1 | 4/2011 | Bossen et al. | |
| 2011/0085593 A1 | 4/2011 | Wang et al. | |
| 2011/0090964 A1* | 4/2011 | Xu | H04N 5/144 375/240.16 |
| 2011/0150095 A1 | 6/2011 | Choi et al. | |
| 2011/0176612 A1 | 7/2011 | Tsai et al. | |
| 2012/0008688 A1 | 1/2012 | Tsai et al. | |
| 2012/0093217 A1* | 4/2012 | Jeon | H04N 19/46 375/240.02 |
| 2012/0106634 A1 | 5/2012 | Jeon et al. | |
| 2012/0128060 A1 | 5/2012 | Lin et al. | |
| 2012/0147966 A1* | 6/2012 | Lee | H04N 19/52 375/240.16 |
| 2012/0155542 A1* | 6/2012 | Lee | H04N 19/00436 375/240.16 |
| 2012/0177125 A1 | 7/2012 | Sugio et al. | |
| 2012/0189055 A1* | 7/2012 | Chien | H04N 19/52 375/240.14 |
| 2012/0189058 A1* | 7/2012 | Chen | H04N 19/159 375/240.15 |
| 2012/0195368 A1* | 8/2012 | Chien | H04N 19/52 375/240.02 |
| 2012/0207219 A1 | 8/2012 | Someya | |
| 2012/0269268 A1* | 10/2012 | Kim | H04N 19/56 375/240.16 |
| 2012/0275518 A1* | 11/2012 | Kadono | H04N 19/61 375/240.14 |
| 2012/0281764 A1* | 11/2012 | Lee | H04N 19/52 375/240.16 |

(56) References Cited

U.S. PATENT DOCUMENTS

| | | | |
|---|---|---|---|
| 2012/0328024 A1* | 12/2012 | Kondo | H04N 19/105 375/240.16 |
| 2013/0279594 A1* | 10/2013 | Lee | H04N 19/52 375/240.16 |
| 2013/0336402 A1* | 12/2013 | Xu | H04N 5/144 375/240.16 |
| 2015/0245048 A1 | 8/2015 | Sugio et al. | |
| 2017/0111637 A1* | 4/2017 | Jeon | H04N 19/56 |
| 2017/0324976 A1* | 11/2017 | Kondo | H04N 19/30 |
| 2018/0234696 A1* | 8/2018 | Kadono | H04N 19/172 |

FOREIGN PATENT DOCUMENTS

| | | |
|---|---|---|
| EP | 1 503 599 | 2/2005 |
| JP | 2003-333600 | 11/2003 |
| JP | 2004-23458 | 1/2004 |
| JP | 2004-129191 | 4/2004 |
| JP | 2004-208258 | 7/2004 |
| JP | 2004-208259 | 7/2004 |
| JP | 2009-201112 | 9/2009 |
| JP | 5020829 | 6/2012 |
| JP | 5970654 | 8/2016 |
| JP | 6187886 | 8/2017 |
| WO | 2004/008775 | 1/2004 |
| WO | 2007/074543 | 7/2007 |

OTHER PUBLICATIONS

Iain E. Richardson, "The H.264 Advanced Video Compression Standard", 2nd Edition, Chapter 5, "H.264 syntax", Apr. 20, 2010, XP030001636.

Joel Jung et al., "Competition-Based Scheme for Motion Vector Selection and Coding", ITU-T Telecommunications Standardization Sector, Study Group 16 Question 6, Video Coding Experts Group (VCEG), VCEG-AC06r1, 29th Meeting: Klagenfurt, Austria, Jul. 17-18, 2006, XP030003490.

Extended European Search Report dated May 20, 2014 in European Application No. 12734216.0.

Frank Bossen et al., "Simplified motion vector coding method", Joint Collaborative Team on Video Coding (JCT-VC) of ITU-T SG16 WP3 and ISO/IEC JTC1/SC29/WG11, JCTVC-B094, 2nd Meeting: Geneva, CH, Jul. 21-28, 2010.

"Test Model under Consideration", Joint Collaborative Team on Video Coding (JCT-VC) of ITU-T SG16 WP3 and ISO/IEC JTC1/SC29/WG11, 1st Meeting: Dresden, DE, Apr. 15-23, 2010, pp. 1, 39, 74 and 75.

Extended European Search Report dated Mar. 16, 2016 in European Patent Application No. 11843582.5.

Office Action dated Nov. 3, 2016 in U.S. Appl. No. 14/957,886.

Office Action dated May 18, 2017 in U.S. Appl. No. 14/707,407.

Office Action dated Feb. 28, 2017 in U.S. Appl. No. 14/856,965.

Office Action dated Nov. 20, 2017 issued for U.S. Appl. No. 14/707,407.

Office Action dated Mar. 2, 2018 issued for U.S. Appl. No. 15/790,374.

ITU-T H.264, Telecommunication Standardization Sector of ITU, Series H: Audiovisual and Multimedia Systems Infrastructure of audiovisual services—Coding of moving video, Advanced video coding for generic audiovisual services, Mar. 2010.

"Test Model under Consideration", Output Document (draft007), Joint Collaborative Team on Video Coding (JCT-VC) of ITU-T SG16 WP3 and ISO/IEC JTC1/SC29/WG11 $2^{nd}$ Meeting: Geneva, CH, Document: JCTVC-B205, ITU-T, Oct. 2010.

Byeong-Moon Jeon, "Direct mode in B pictures", Joint Video Team (JVT) of ISO/IEC MPEG & ITU-T VCEG (ISO/IEC JTC1/SC29/WG11 and ITU-T SG16 Q.6) $4^{th}$ Meeting: Klagenfurt, Austria, Contribution: JVT-D056, ITU-T, Jul. 2002.

J. Jung et al., "TE11: Report on experiment 3.3.b: 'temporally oriented' set of predictors for MV-Competition", Joint Collaborative Team on Video Coding (JCT-VC) of ITU-T SG16 WP3 and ISO/IEC JTC1/SC29/WG11 $3^{rd}$ Meeting: Guangzhou, CN, Document: JCTVC-C291, ITU-T, Oct. 2010.

Jiali Zheng et al., "Extended Direct Mode for Hierarchical B Picture Coding", IEEE International Conference on Image Porcessing, 2005, ICIP 2005, vol. 2, IEEE, Sep. 11, 2005, pp. II-265-II-268.

Joel Jung and Guillaume Laroche, "Competition-Based Scheme for Motion Vector Selection and Coding", ITU-Telecommunications Standardization Sector Study Group 16 Question 6 Video Coding Experts Group (VCEG) $29^{th}$ Meeting: Klagenfurt, Austria, Document VCEG-AC06, ITU-T, Jul. 2006.

"Test Model under Consideration", Output Document (draft007), Joint Collaborative Team on Video Coding (JCT-VC) of ITU-T SG16 WP3 and ISO/IEC JTC1/SC29/WG11, $2^{nd}$ Meeting: Geneva, CH, Oct. 2010, JCTVC-B205, pp. 1-14, 26, 27, 35-39, 53, 61-64 and 80-93.

Toshiyasu Sugio et al., "Modified usage of predicted motion vectors in forward directional bi-predictive coding frame", Joint Collaborative Team on Video Coding (JCT-VC) of ITU-T SG16 WP3 and ISO/IEC JTC1/SC29/WG11, JCTVC-D274, $4^{th}$ Meeting: Daegu, KR, Jan. 2011.

Jian-Liang Lin et al., "Improved Advanced Motion Vector Prediction", Joint Collaborative Team on Video Coding (JCT-VC) of ITU-T SG16 WP3 and ISO/IEC JTC1/SC29/WG11, JCTVC-D125_r2, $4^{th}$ Meeting: Daegu, KR, Jan. 2011, pp. 1-8.

Toshiyasu Sugio et al., "Modified derivation process of temporal motion vector predictor", Joint Collaborative Team on Video Coding (JCT-VC) of ITU-T SG16 WP3 and ISO/IEC JTC1/SC29/WG11, $4^{th}$ Meeting: Daegu, KR, Jan. 2011, JCTVC-D273, pp. 1-4.

"Test Model under Consideration" Output Document (draft007), Joint Collaborative Team on Video Coding (JCT-VC) of ITU-T SG16 WP3 and ISO/IEC JTC1/SC29/WG11, $2^{nd}$ Meeting: Geneva, CH, Document: JCTVC-B205, Oct. 2010, pp. 78-93.

International Search Report dated Mar. 6, 2012 in corresponding International Application No. PCT/JP2011/006641.

"Test Model under Consideration", Output Document (draft005), Joint Collaborative Team on Video Coding (JCT-VC) of ITU-T SG16 WP3 and ISO/IEC JTC1/SC29/WG11, JCTVC-B205, $2^{nd}$ Meeting: Geneva, CH, Sep. 2010, pp. 1-6, and 82-96.

International Search Report dated Apr. 24, 2012 in corresponding International Application No. PCT/JP2012/000131.

"Test Model under Consideration", Output Document (draft007), Joint Collaborative Team on Video Coding (JCT-VC) of ITU-T SG16 WP3 and ISO/IEC JTC1/SC29/WG11, $2^{nd}$ Meeting: Geneva, CH, Document: JCTVC-B205, ITU-T, Oct. 2010, pp. 78-93.

Draft of Version 4 of ISO/IEC 14496-10, Joint Video Team (JVT) of ISO/IEC MPEG & ITU-T VECG (ISO/IEC JTC1/SC29/WG11 and ITU T SG16 Q.6), $14^{th}$ Meeting: Hong Kong, CH, Jan. 18-21, 2005, Document: JVT-N050d1, Filename: JVT-N050d1.doc, Date: Jan. 28, 2005, pp. 105-106.

International Search Report dated May 29, 2012 in corresponding International Application No. PCT/JP2012/001389.

"Test Model under Consideration", Output Document (draft007), Joint Collaborative Team on Video Coding (JCT-VC) of ITU-T SG16 WP3 and ISO/IEC JTC1/SC29/WG11, JCTVC-B205, $2^{nd}$ Meeting: Geneva, CH, Oct. 2010, pp. 1-6 and 80-93.

Byeong-Moon Jeon, "Direct mode in B pictures", Joint Video Team (JVT) of ISO/IEC MPEG & ITU-T VCEG (ISO/IEC JTC1/SC29/WG11 and ITU-T SG16 Q.6) JVT-D056, $4^{th}$ Meeting: Klagenfurt, Austria, Jul. 2002, pp. 1-7.

Toshiyasu Sugio et al., "CE9: Experiment A, I, J and S Modified derivation process of reference index for skip mode and temporal motion vector predictor", Joint Collaborative Team on Video Coding (JCT-VC) of ITU-T SG16 WP3 and ISO/IEC JTC1/SC29/WG11, 5th Meeting: Geneva, CH, Mar. 2011, JCTVC-E230, pp. 1-6.

Triceps corporation, "Jisedai Dougazou Fugouka Houshiki (Next Generation Video Coding Method)", MPEG-4 AVC | H.264, Mar. 12, 2004, pp. 64-66 (Chapter 6.2 to 7) (with partial translation).

International Search Report dated Feb. 7, 2012 in corresponding International Application No. PCT/JP2011/006517.

(56) References Cited

OTHER PUBLICATIONS

Thomas Wiegand et al., "WD1: Working Draft 1 of High-Efficiency Video Coding", Joint Collaborative Team on Video Coding (JCT-VC) of ITU-T SG16 WP3 and ISO/IEC JTC1/SC29/WG11, JCTVC-C403, Ver. 1, 3rd Meeting: Guangzhou, CN, Oct. 7-15, 2010.

* cited by examiner

FIG. 3B

| Motion vector predictor index | Motion vector predictor candidate |
|---|---|
| 0 | Median(MV_A, MV_B, MV_C) |
| 1 | MV_A |
| 2 | MV_B |
| 3 | MV_C |
| 4 | Temporal direct vector 1 |
| 5 | Temporal direct vector 2 |

FIG. 3C

| Motion vector predictor index | Motion vector predictor candidate |
|---|---|
| 0 | Temporal direct vector 1 |
| 1 | Temporal direct vector 2 |
| 2 | Median(MV_A, MV_B, MV_C) |
| 3 | MV_A |
| 4 | MV_B |
| 5 | MV_C |

FIG. 3D

| Motion vector predictor index | Motion vector predictor candidate |
|---|---|
| 0 | Median(MV_A, MV_B, MV_C) |
| 1 | MV_A |
| 2 | MV_B |
| 3 | MV_C |
| 4 | Temporal direct vector 1 |
| 5 | Temporal direct vector 2 |

FIG. 3E

| Motion vector predictor index | Motion vector predictor candidate |
|---|---|
| 0 | Temporal direct vector 1 |
| 1 | Median(MV_A, MV_B, MV_C) |
| 2 | MV_A |
| 3 | MV_B |
| 4 | MV_C |

FIG. 3F

| Motion vector predictor index | Motion vector predictor candidate |
|---|---|
| 0 | Median(MV_A, MV_B, MV_C) |
| 1 | MV_A |
| 2 | MV_B |
| 3 | MV_C |
| 4 | Temporal direct vector 1 |

FIG. 4

| Motion vector predictor index | Allocated bit sequence |
|---|---|
| 0 | 0 |
| 1 | 10 |
| 2 | 110 |
| 3 | 1110 |
| 4 | 11110 |
| 5 | 111110 |

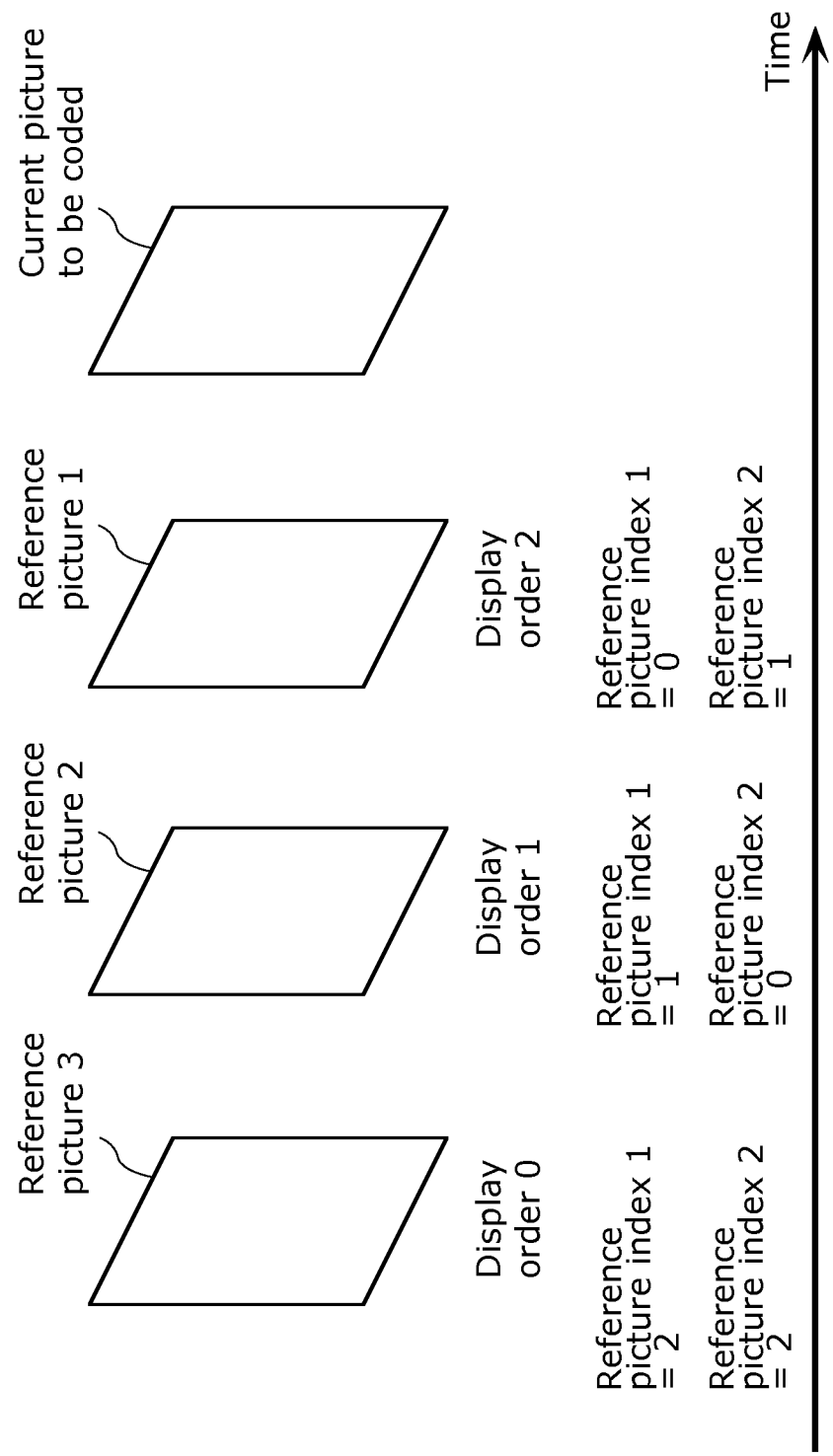

FIG. 13B
Prior art

Reference picture list 1

| Reference picture index 1 | Display order |
|---|---|
| 0 | 2 |
| 1 | 1 |
| 2 | 0 |

FIG. 13C
Prior art

Reference picture list 2

| Reference picture index 2 | Display order |
|---|---|
| 0 | 1 |
| 1 | 2 |
| 2 | 0 |

FIG. 21

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 24
Stream of TS packets
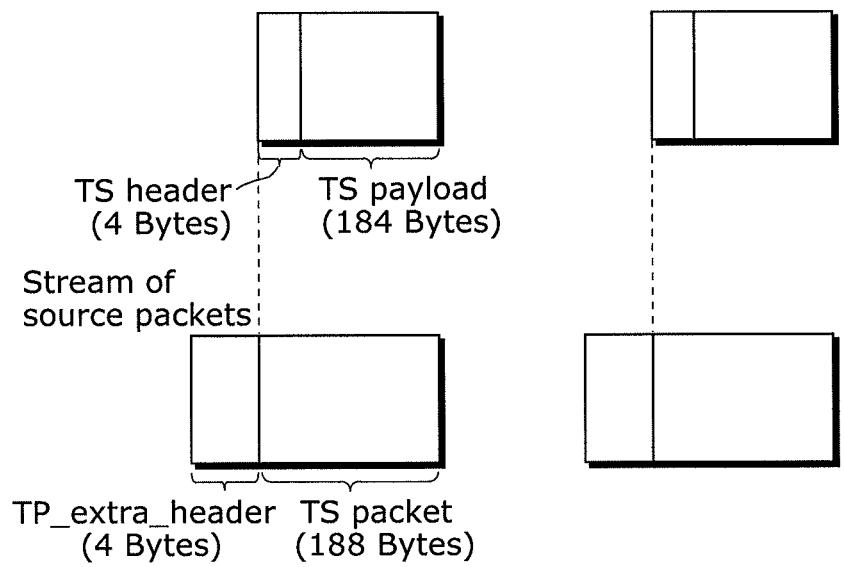
Multiplexed data
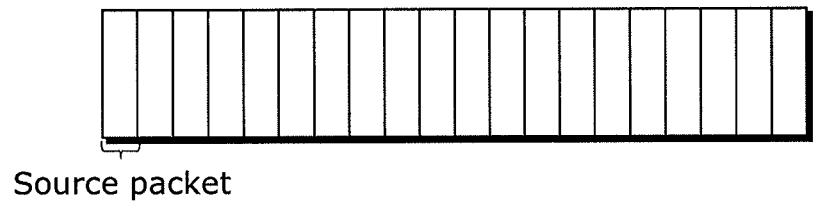
FIG. 25
Data structure of PMT
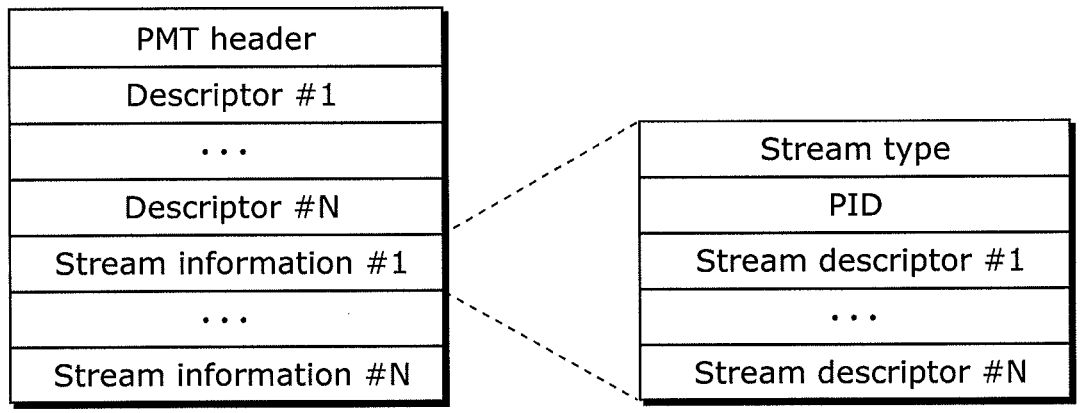

| Corresponding standard | Driving frequency |
|---|---|
| MPEG-4 AVC | 500 MHz |
| MPEG-2 | 350 MHz |
| ⋮ | ⋮ |

MOVING PICTURE CODING METHOD, MOVING PICTURE CODING APPARATUS, MOVING PICTURE DECODING METHOD, AND MOVING PICTURE DECODING APPARATUS

TECHNICAL FIELD

The present invention relates to a moving picture coding method and a moving picture decoding method.

BACKGROUND ART

In moving picture coding processes, an information amount is typically compressed using redundancy of moving pictures in spatial and temporal directions. Here, transformation into a frequency domain is typically used as a compression method using redundancy in the spatial direction. Furthermore, inter-picture prediction (hereinafter referred to as "inter prediction") is used as a compression method using redundancy in the temporal direction. In coding a certain picture, a coded picture preceding or following the current picture to be coded in display time order is used as a reference picture in the inter prediction coding. Then, a motion vector is derived from motion estimation of the current picture with reference to the reference picture. The redundancy in the temporal direction is removed by obtaining a difference between predicted image data obtained through motion compensation based on the motion vector and image data of the current picture. Here, in the motion estimation, a difference value between the current block to be coded within the current picture and each of blocks in the reference picture is calculated, and the block in the reference picture having the smallest difference value is determined to be a reference block. Then, the motion vector is estimated using the current block and the reference block.

The moving picture coding scheme called H.264 which has already been standardized uses three types of pictures, that is, I-picture, P-picture, and B-picture to compress the information amount. The I-picture is a picture on which the inter prediction coding is not performed, that is, prediction coding within a picture (hereinafter referred to as "intra prediction") is performed. The P-picture is a picture on which the inter prediction coding is performed with reference to one coded picture preceding or following the current picture in display time order. The B-picture is a picture on which the inter prediction coding is performed with reference to two coded pictures preceding or following the current picture in display time order.

The inter prediction coding generates a reference picture list for identifying a reference picture. The reference picture list is a list in which reference picture indexes are allocated to coded reference pictures to be referenced in the inter prediction. For example, since the B-picture is coded with reference to two pictures, two reference picture lists are held. Then, the reference pictures are identified by the reference picture indexes from the reference picture lists.

FIG. 13A illustrates an example of reference pictures. FIGS. 13B and 13C show an example of reference picture lists for the B-pictures. A reference picture list 1 (hereinafter referred to as "reference picture list L0") in FIG. 13B is an example of a reference picture list for a prediction direction 1 in the bi-directional prediction. Here, a reference picture index 1 indicated by 0 is allocated to a reference picture 1 in the display order 2. Furthermore, a reference picture index 1 indicated by 1 is allocated to a reference picture 2 in the display order 1. Furthermore, a reference picture index 1 indicated by 2 is allocated to a reference picture 3 in the display order 0. In other words, the reference picture indexes are allocated to the current pictures to be coded from the earliest display time order.

A reference picture list 2 (hereinafter referred to as "reference list L1") is an example of a reference picture list for a prediction direction 2 in the bi-directional prediction. Here, a reference picture index 2 indicated by 0 is allocated to the reference picture 2 in the display order 1. Furthermore, a reference picture index 2 indicated by 1 is allocated to the reference picture 1 in the display order 2. Furthermore, a reference picture index 2 indicated by 2 is allocated to the reference picture 3 in the display order 0. As such, different reference picture indexes can be allocated to each of the reference pictures, according to a prediction direction (reference pictures 1 and 2 in FIG. 13A), and the same reference picture index can be allocated to a reference picture (reference picture 3 in FIG. 13A). When a B-picture is coded, the inter prediction is performed using (i) a motion vector (mvL0) for referencing a reference picture identified by the reference list L0 and the reference picture index 1 and (ii) a motion vector (mvL1) for referencing a reference picture identified by the reference list L1 and the reference picture index 2. In coding a P-picture, one reference list is used.

Furthermore, in the H.264 moving picture coding scheme, a coding mode referred to as a temporal direct mode can be selected when a motion vector is derived in coding the B-picture. The inter prediction coding method in the temporal direct mode will be described with reference to FIG. 14. FIG. 14 illustrates motion vectors in the temporal direct mode, and a case where a block "a" of a picture B2 is coded in the temporal direct mode. Here, a motion vector "a" is used. The motion vector "a" is used in coding a block "b" that is co-located with the block "a" and is within a picture P3 that is a reference picture behind the picture B2. Furthermore, when the block "b" is coded, the motion vector "a" is used and references a picture P1. The block "a" obtains a reference block from the picture P1 that is a forward reference picture and the picture P3 that is a backward reference picture, using a motion vector parallel to the motion vector "a", and is coded in the bi-directional prediction. In other words, the motion vector used in coding the block "a" is the motion vector "b" for the picture P1, and is the motion vector "c" for the picture P3.

CITATION LIST

Non Patent Literature

NPL 1: ITU-T H.264 03/2010

SUMMARY OF INVENTION

Technical Problem

Conventionally, the motion vector used in the temporal direct mode is a motion vector for a reference picture behind the current picture in display time order, and is limited to a motion vector in a forward direction in display time order.

Such a limitation in the motion vector used in the temporal direct mode makes it difficult to derive a motion vector appropriate for the current picture. This causes a problem of decrease in a compression rate.

The present invention has been conceived to solve the problems, and has an object of providing a moving picture coding method and a moving picture decoding method for deriving a motion vector appropriate for the current picture to be coded to increase the compression rate.

Solution to Problem

In order to achieve the object, a moving picture coding method according to an aspect of the present invention is a moving picture coding method for coding a current block included in a current picture to be coded, and includes: determining whether or not a first block has two reference motion vectors for referencing a same direction that is one of a forward direction and a backward direction in display order, the first block being included in a first picture different from the current picture and being co-located, in the first picture, with the current block within the current picture; calculating, when it is determined in the determining that the first block has the two reference motion vectors, first and second motion vector predictor candidates that are candidates for a motion vector for the current block, by scaling the two reference motion vectors; selecting a motion vector predictor candidate having a smallest difference with a predetermined motion vector, from among motion vector predictor candidates including the first and second motion vector predictor candidates; and coding the current block using the predetermined motion vector, and coding (i) a difference value between the selected motion vector predictor candidate and the predetermined motion vector and (ii) information for identifying the selected motion vector predictor candidate.

Accordingly, the moving picture coding method according to an aspect of the present invention can increase the compression rate by deriving a motion vector more appropriate for the current picture to be coded.

Furthermore, in the determining, it may be determined that the first block has the two reference motion vectors when an allocation order of indexes to pictures that can be referenced by the first picture is uniform between a first reference picture list and a second reference picture list that are for the first picture.

Furthermore, the calculating may further include: calculating, when it is determined in the determining that the first block does not have the two reference motion vectors and the first picture precedes the current picture in display order, one of the motion vector predictor candidates for the current block, by scaling a reference motion vector for the first block for referencing the backward direction in display order; and calculating, when it is determined in the determining that the first block does not have the two reference motion vectors and the first picture follows the current picture in display order, one of the motion vector predictor candidates for the current block, by scaling a reference motion vector for the first block for referencing the forward direction in display order.

Furthermore, the predetermined motion vector may be a motion vector calculated by motion estimation.

Furthermore, the information for identifying the selected motion vector predictor candidate may be an index, and when the index is coded, in the coding, a code sequence of the index may be longer as a value of the index is larger.

Furthermore, the calculating may further include: calculating one of the motion vector predictor candidates for the current block, using a reference motion vector for a second block for referencing the forward direction in display order, when the first block precedes the current block in display order and does not have any reference motion vector, the second block following the current block in display order; and calculating one of the motion vector predictor candidates for the current block, using a reference motion vector for a third block for referencing the backward direction in display order, when the first block follows the current block in display order and does not have any reference motion vector, the third block preceding the current block in display order.

Furthermore, in the calculating, one of the motion vector predictor candidates for the current block may be calculated using a reference motion vector for the second block for referencing the backward direction in display order, when the first block precedes the current block in display order and does not have any reference motion vector and when the second block does not have any reference motion vector for referencing the forward direction in display order, and one of the motion vector predictor candidates for the current block may be calculated using a reference motion vector for the third block for referencing the forward direction in display order, when the first block follows the current block in display order and does not have any reference motion vector and when the third block does not have any reference motion vector for referencing the backward direction in display order.

Furthermore, the calculating may further include determining (i) a motion vector for an adjacent block to the left of the current block, as a third motion vector predictor candidate, (ii) a motion vector for an adjacent block above the current block, as a fourth motion vector predictor candidate, and (iii) a motion vector for an adjacent block to the upper right of the current block, as a fifth motion vector predictor candidate, and the selecting may include selecting a motion vector predictor candidate having a smallest difference with the predetermined motion vector, from among the first to the fifth motion vector predictor candidates.

Furthermore, values of indexes for the first and the second motion vector predictor candidates may be determined to be smaller than values of indexes for the third, the fourth, and the fifth motion vector predictor candidates, when the two reference motion vectors are motion vectors in a direction from the first picture to the current picture.

Furthermore, a moving picture decoding method according to an aspect of the present invention is a moving picture decoding method for decoding a current block included in a current picture to be decoded, and includes: determining whether or not a first block has two reference motion vectors for referencing a same direction that is one of a forward direction and a backward direction in display order, the first block being included in a first picture different from the current picture and being co-located, in the first picture, with the current block within the current picture; calculating, when it is determined in the determining that the first block has the two reference motion vectors, first and second motion vector predictor candidates that are candidates for a motion vector for the current block, by scaling the two reference motion vectors; generating a motion vector predictor list indicating one-to-one correspondence between motion vector predictor candidates and values of motion vector predictor indexes, the motion vector predictor candidates including the first and the second motion vector predictor candidates; decoding index information for identifying one of the motion vector predictor candidates for use in decoding; decoding difference value information between a predetermined motion vector and the one of motion vector predictor candidates; calculating a motion vector by adding, to the difference value information, a motion vector predictor candidate identified by a motion vector predictor index having a value identical to a value of the index information, the motion vector predictor candidate being included in the motion vector predictor candidates indicated in the motion vector predictor list; and decoding the current block using the calculated motion vector.

Accordingly, the moving picture decoding method according to an aspect of the present invention can increase the compression rate by deriving a motion vector more appropriate for the current picture to be decoded.

Furthermore, in the determining, it may be determined that the first block has the two reference motion vectors when an allocation order of indexes to pictures that can be referenced by the first picture is uniform between a first reference picture list and a second reference picture list that are for the first picture.

Furthermore, the calculating may further include: calculating, when it is determined in the determining that the first block does not have the two reference motion vectors and the first picture precedes the current picture in display order, one of the motion vector predictor candidates for the current block, by scaling a reference motion vector for the first block for referencing the backward direction in display order; and calculating, when it is determined in the determining that the first block does not have the two reference motion vectors and the first picture follows the current picture in display order, one of the motion vector predictor candidates for the current block, by scaling a reference motion vector for the first block for referencing the forward direction in display order.

Furthermore, the calculating may further include: calculating one of the motion vector predictor candidates for the current block, using a reference motion vector for a second block for referencing the forward direction in display order, when the first block precedes the current block in display order and does not have any reference motion vector, the second block following the current block in display order; and calculating one of the motion vector predictor candidates for the current block, using a reference motion vector for a third block for referencing the backward direction in display order, when the first block follows the current block in display order and does not have any reference motion vector, the third block preceding the current block in display order.

Furthermore, in the calculating, one of the motion vector predictor candidates for the current block may be calculated using a reference motion vector for the second block for referencing the backward direction in display order, when the first block precedes the current block in display order and does not have any reference motion vector and when the second block does not have any reference motion vector for referencing the forward direction in display order, and one of the motion vector predictor candidates for the current block may be calculated using a reference motion vector for the third block for referencing the forward direction in display order, when the first block follows the current block in display order and does not have any reference motion vector and when the third block does not have any reference motion vector for referencing the backward direction in display order.

Furthermore, in the calculating, one of the motion vector predictor candidates for the current block may be calculated using a reference motion vector for the second block for referencing the backward direction in display order, when the first block precedes the current block in display order and does not have any reference motion vector and when the second block does not have any reference motion vector for referencing the forward direction in display order, and one of the motion vector predictor candidates for the current block may be calculated using a reference motion vector for the third block for referencing the forward direction in display order, when the first block follows the current block in display order and does not have any reference motion vector and when the third block does not have any reference motion vector for referencing the backward direction in display order.

The present invention can be implemented not only as such a moving picture coding method and a moving picture decoding method but also as a moving picture coding apparatus and a moving picture decoding apparatus that include characteristic steps included in the moving picture coding method and the moving picture decoding method, respectively, and as a program causing a computer to execute such characteristic steps. Furthermore, such a program can be distributed through a non-transitory computer-readable recording medium such as a CD-ROM, and via a transmission medium such as the Internet.

Furthermore, the present invention can be implemented as a semiconductor integrated circuit (LSI) that is a part or an entire of such a moving picture coding apparatus or a moving picture decoding apparatus, and as a moving picture coding and decoding apparatus including the moving picture coding apparatus and the moving picture decoding apparatus.

Advantageous Effects of Invention

Accordingly, the present invention can increase a compression rate by deriving a motion vector more appropriate for the current picture to be coded.

BRIEF DESCRIPTION OF DRAWINGS

FIG. 3B shows an example of allocation of motion vector predictor indexes according to Embodiment 1.

FIG. 3C shows an example of allocation of motion vector predictor indexes according to Embodiment 1.

FIG. 3D shows an example of allocation of motion vector predictor indexes according to Embodiment 1.

FIG. 3E shows an example of allocation of motion vector predictor indexes according to Embodiment 1.

FIG. 3F shows an example of allocation of motion vector predictor indexes according to Embodiment 1.

FIG. 4 is a code table of motion vector predictor indexes according to Embodiment 1.

FIG. 13A illustrates example reference pictures.

FIG. 13B is an example reference picture list.

FIG. 13C is an example reference picture list.

FIG. 21 illustrates a structure of the multiplexed data.

FIG. 24 illustrates a structure of TS packets and source packets in the multiplexed data.

FIG. 25 illustrates a data structure of a PMT.

DESCRIPTION OF EMBODIMENTS

Embodiments according to the present invention will be described with reference to the drawings. Embodiments to be described hereinafter indicate specific and preferable examples of the present invention. The values, shapes, materials, constituent elements, positions and connections of the constituent elements, steps, and orders of the steps indicated in Embodiments are examples, and do not limit the present invention. The present invention is specified only by the claims. Furthermore, the constituent elements in Embodiments that are not described in independent claims that describe the most generic concept of the present invention are described as arbitrary constituent elements for composing more preferable embodiments.

Embodiment 1

Figure 1:
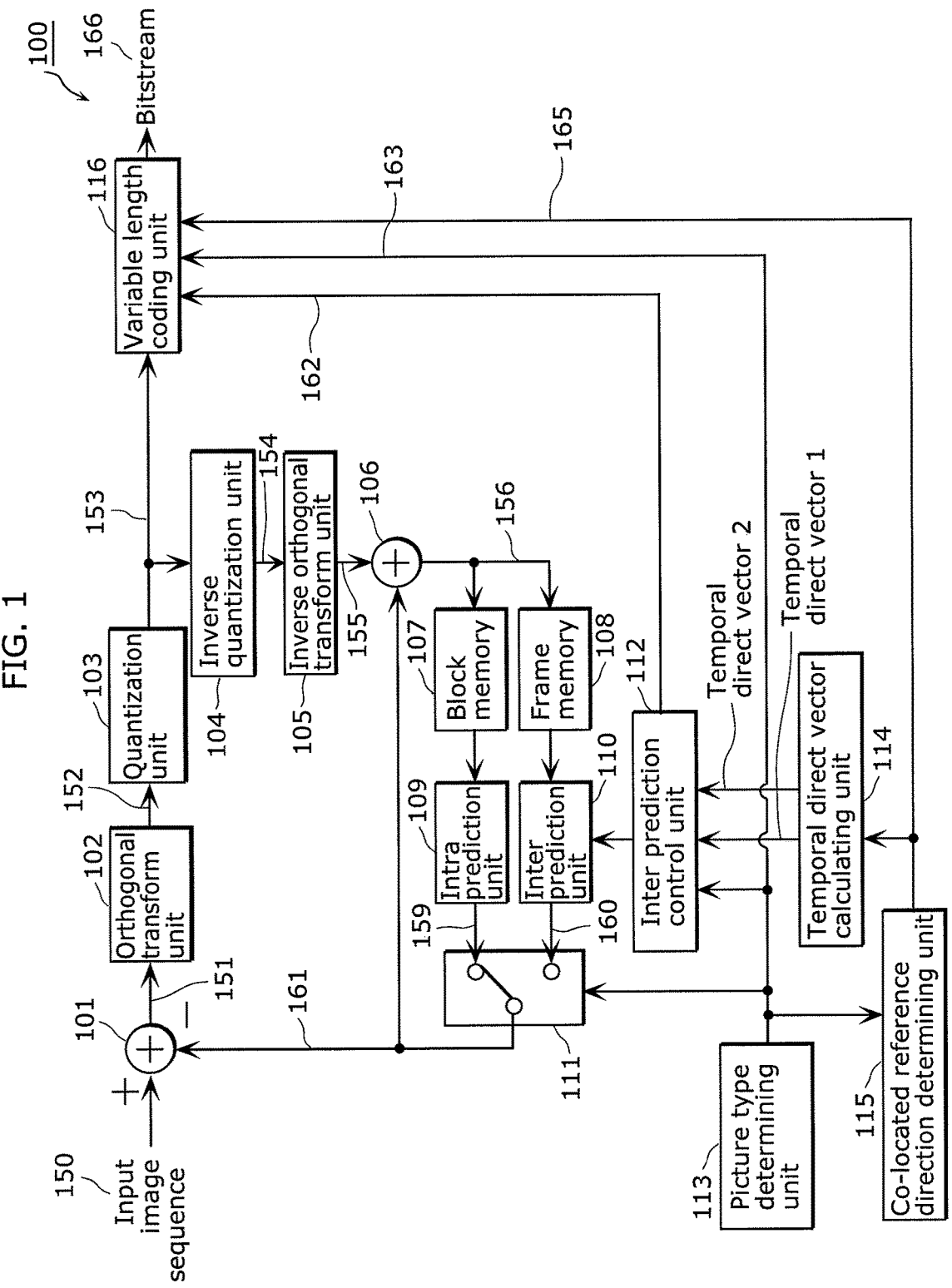
FIG. 1 is a block diagram of a moving picture coding apparatus according to Embodiment 1 in the present invention.

FIG. 1 is a block diagram illustrating a configuration of a moving picture coding apparatus using a moving picture coding method according to Embodiment 1.

A moving picture coding apparatus 100 codes an input image sequence 150 to generate a bitstream 166. As illustrated in FIG. 1, the moving picture coding apparatus 100 includes a subtractor 101, an orthogonal transform unit 102, a quantization unit 103, an inverse quantization unit 104, an inverse orthogonal transform unit 105, an adder 106, a block memory 107, a frame memory 108, an intra prediction unit 109, an inter prediction unit 110, a switch 111, an inter prediction control unit 112, a picture type determining unit 113, a temporal direct vector calculating unit 114, a co-located reference direction determining unit 115, and a variable length coding unit 116.

The subtractor 101 subtracts a predicted image 161 from the current block to be coded included in the input image sequence 150 to generate a difference image 151.

The orthogonal transform unit 102 transforms the difference image 151 from an image domain to a frequency domain to generate a coefficient block 152 including frequency coefficients. The quantization unit 103 quantizes the coefficient block 152 to generate quantized coefficients 153. The inverse quantization unit 104 inversely quantizes the quantized coefficients 153 to generate a coefficient block 154.

The inverse orthogonal transform unit 105 transforms the coefficient block 154 from the frequency domain to the image domain to generate a decoded difference image 155. The adder 106 adds the predicted image 161 to the decoded difference image 155 to generate a decoded image 156.

The block memory 107 stores the decoded image 156 per block. The frame memory 108 stores the decoded image 156 per frame.

The picture type determining unit 113 determines in which picture type the input image sequence 150 is coded, either I-picture, B-picture, or P-picture, and generates picture type information 163 indicating a result of the determination.

The intra prediction unit 109 performs intra-prediction coding on the current block using the decoded image 156 stored per block in the block memory 107 to generate a predicted image 159.

The inter prediction unit 110 performs inter-prediction coding on the current block using (i) the decoded image 156 stored per frame in the frame memory 108 and (ii) a motion vector derived from the motion estimation to generate a predicted image 160.

When the intra-prediction coding is performed on the current block, the switch 111 selects the predicted image 159. When the inter-prediction coding is performed on the current block, the switch 111 selects the predicted image 160. Then, the switch 111 outputs the selected predicted image as the predicted image 161.

The co-located reference direction determining unit 115 determines one of a block included in a picture preceding the current picture to be coded in display time order (hereinafter referred to as "forward reference block") and a block included in a picture following the current picture in display time order (hereinafter referred to as "backward reference block") to be used as a co-located block. Then, the co-located reference direction determining unit 115 generates a co-located reference direction flag 165 indicating a direction in which the determined co-located block is located (forward direction or backward direction) for each picture, and attaches the generated co-located reference direction flag 165 to the current picture. Here, the co-located block is a block in a picture different from the picture including the current block, and is a block co-located with the current block in the picture.

The temporal direct vector calculating unit 114 derives, in the temporal direct mode, a motion vector predictor candidate using the motion vector used in the co-located block. Hereinafter, the motion vector for referencing a forward direction in display order will be referred to as a forward reference motion vector, and a motion vector for referencing a backward direction in display order will be referred to as a backward reference motion vector.

More specifically, the temporal direct vector calculating unit 114 derives, in the temporal direct mode, motion vector predictor candidates (temporal direct vectors 1 and 2) using the two motion vectors for the co-located block, when the co-located block has two forward reference motion vectors or two backward reference motion vectors, that is, when the co-located block has two motion vectors for referencing the same direction. Furthermore, the temporal direct vector calculating unit 114 allocates a value of a motion vector predictor index corresponding to each of the temporal direct vectors 1 and 2.

Furthermore, when the co-located block has neither the two forward reference motion vectors nor the two backward reference motion vectors, the temporal direct vector calculating unit 114 determines a motion vector for the co-located block to be used in the temporal direct mode, according to whether the co-located block is a forward reference block or a backward reference block. More specifically, when the co-located block is a backward reference block, the temporal direct vector calculating unit 114 derives, in the temporal direct mode, a motion vector predictor candidate (temporal direct vector 1) using the forward reference motion vector for the co-located block. Furthermore, when the co-located block is a backward reference block and does not have any forward reference motion vector, the temporal direct vector calculating unit 114 derives, in the temporal direct mode, a motion vector predictor candidate (temporal direct vector 1) using the backward reference motion vector for the co-located block. Here, the case where the co-located block has neither the two forward reference motion vectors nor the two backward reference motion vectors corresponds to the case where the co-located block has only one forward reference motion vector, only one backward reference motion vector, or one forward reference motion vector and one backward reference motion vector.

When the co-located block is a forward reference block, the temporal direct vector calculating unit 114 derives, in the temporal direct mode, a motion vector predictor candidate (temporal direct vector 1) using the backward reference motion vector for the co-located block. Furthermore, when the co-located block is a forward reference block and does not have any backward reference motion vector, the temporal direct vector calculating unit 114 derives, in the temporal direct mode, a motion vector predictor candidate (temporal direct vector 1) using the forward reference motion vector for the co-located block.

The inter prediction control unit 112 selects one of motion vector predictor candidates having the smallest difference with the motion vector derived from the motion estimation, as the motion vector predictor, and determines to code the motion vector using the selected motion vector predictor. Here, the difference is a difference value between the motion vector predictor candidate and the motion vector derived from the motion estimation. Furthermore, the inter prediction control unit 112 generates a motion vector predictor index 162 corresponding to the determined motion vector predictor, per block. Furthermore, the inter prediction control unit 112 transmits the motion vector predictor index 162 and difference information on the motion vector predictor candidate, to the variable length coding unit 116.

The variable length coding unit 116 variable-length codes the quantized coefficients 153 that is prediction error data that has been quantized, the motion vector predictor index 162, prediction error information on the motion vector predictor candidate, the picture type information 163, and the co-located reference direction flag 165 to generate the bitstream 166.

Here, the temporal direct vector calculating unit 114 is an example of a determining unit and a calculating unit according to the present invention. The inter prediction control unit 112 is an example of a selecting unit according to the present invention. The variable length coding unit 116 is an example of a cording unit according to the present invention.

Figure 2:
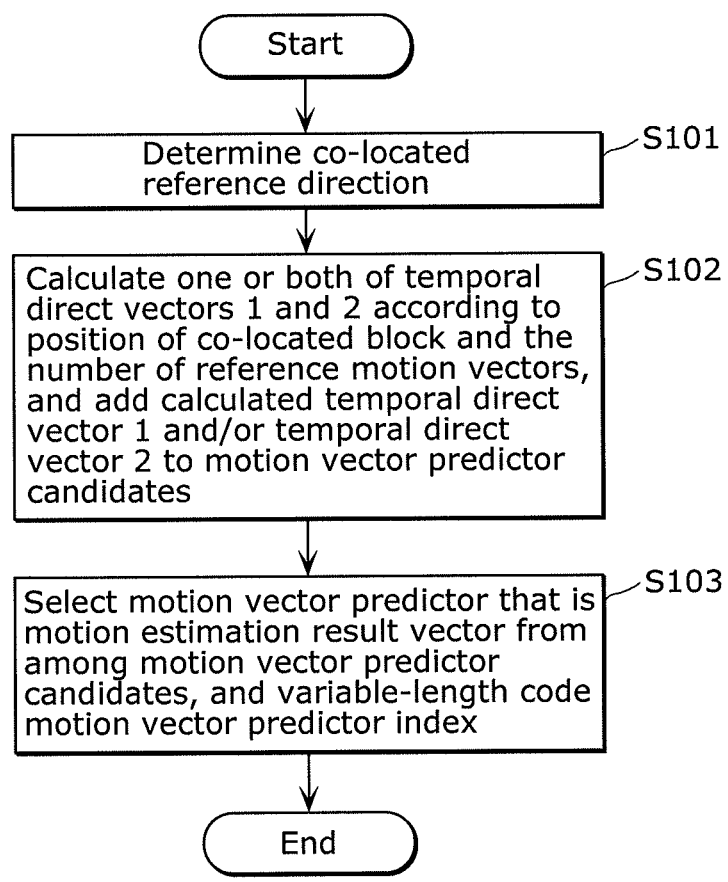
FIG. 2 is a flow chart of a moving picture coding method according to Embodiment 1.

FIG. 2 is a flow chart indicating an outline of processes of a moving picture coding method according to Embodiment 1.

At Step S101, in deriving a motion vector predictor candidate in the temporal direct mode, the co-located reference direction determining unit 115 determines one of a forward reference block and a backward reference block to be used as a co-located block. Furthermore, the co-located reference direction determining unit 115 generates the co-located reference direction flag 165 indicating that the co-located block is a forward reference block or a backward reference block for each picture, and attaches the generated co-located reference direction flag 165 to the picture.

At Step S102, the temporal direct vector calculating unit 114 derives, in the temporal direct mode, motion vector predictor candidates using the reference motion vector for the co-located block. More specifically, when the co-located block has two forward reference motion vectors or two backward reference motion vectors, the temporal direct vector calculating unit 114 derives, in the temporal direct mode, motion vector predictor candidates (temporal direct vectors 1 and 2) using the two motion vectors for the co-located block.

Furthermore, the temporal direct vector calculating unit 114 allocates a value of a corresponding motion vector predictor index to each of the temporal direct vectors 1 and 2. Typically, the smaller the value of the motion vector predictor index is, the smaller the necessary information amount is. On the other hand, the larger the value is, the larger the necessary information amount is. Thus, the coding efficiency increases when the value of the motion vector predictor index corresponding to a motion vector that is highly likely to be a motion vector with higher precision is set smaller.

Here, the temporal direct vector calculating unit 114 sets the value of the index corresponding to the temporal direct vector 1 derived using the reference motion vector 1 (mvL0)

that is one of the two motion vectors for the co-located block, smaller than the value of the index corresponding to the temporal direct vector 2 derived using the reference motion vector 2 (mvL1) that is the other of the two motion vectors for the co-located block. Here, when the co-located block has the two forward reference motion vectors or the two backward reference motion vectors, it is highly likely that the motion estimation is performed on the reference motion vector 1 in priority to the reference motion vector 2 and thus, the temporal direct vector derived using the reference motion vector 1 will have higher precision. The motion vector predictor index having a value smaller than that of the reference motion vector 2 is allocated to the reference motion vector 1 (mvL0) in a motion vector predictor list for the co-located block.

Furthermore, the temporal direct vector calculating unit 114 may allocate a value of an index based on a distance from a picture including the co-located block to a reference picture to be referenced by the co-located block. For example, the temporal direct vector calculating unit 114 determines the distance according to the number of pictures included between the picture including the co-located block and the reference picture to be referenced by the co-located block. When the length of the reference motion vector 1 is shorter than that of the reference motion vector 2, the temporal direct vector calculating unit 114 sets the value of the index of the temporal direct vector 1 smaller than that of the temporal direct vector 2. Here, the temporal direct vector calculating unit 114 may determine the value of the index based on the magnitude of an absolute value of a reference motion vector.

Furthermore, when the co-located block has neither the two forward reference motion vectors nor the two backward reference motion vectors, the temporal direct vector calculating unit 114 determines a motion vector for the co-located block to be used in the temporal direct mode, according to whether the co-located block is a forward reference block or a backward reference block. More specifically, when the co-located block is a backward reference block, the temporal direct vector calculating unit 114 derives, in the temporal direct mode, a motion vector predictor candidate (temporal direct vector 1) using the forward reference motion vector for the co-located block. Furthermore, when the co-located block is a backward reference block and the co-located block does not have any forward reference motion vector, the temporal direct vector calculating unit 114 derives, in the temporal direct mode, a motion vector predictor candidate (temporal direct vector 1) using the backward reference motion vector for the co-located block.

When the co-located block is a forward reference block, the temporal direct vector calculating unit 114 derives, in the temporal direct mode, a motion vector predictor candidate (temporal direct vector 1) using the backward reference motion vector for the co-located block. Furthermore, when the co-located block is a forward reference block and the co-located block does not have any backward reference motion vector, the temporal direct vector calculating unit 114 derives, in the temporal direct mode, a motion vector predictor candidate (temporal direct vector 1) using the forward reference motion vector for the co-located block.

At Step S103, the moving picture coding apparatus 100 performs inter-prediction coding on a picture using the motion vector derived from the motion estimation. Furthermore, the inter prediction control unit 112 selects one of motion vector predictor candidates having the smallest difference, and determines to code the motion vector using the selected motion vector predictor. For example, the difference is a difference value between the motion vector predictor candidate and the motion vector derived from the motion estimation. Then, the inter prediction control unit 112 determines to use the motion vector predictor candidate having the smallest difference for coding the motion vector. Then, the variable length coding unit 116 variable-length codes the motion vector predictor index 162 corresponding to the selected motion vector predictor candidate and the difference information on the determined motion vector predictor candidate.

Figure 3A:
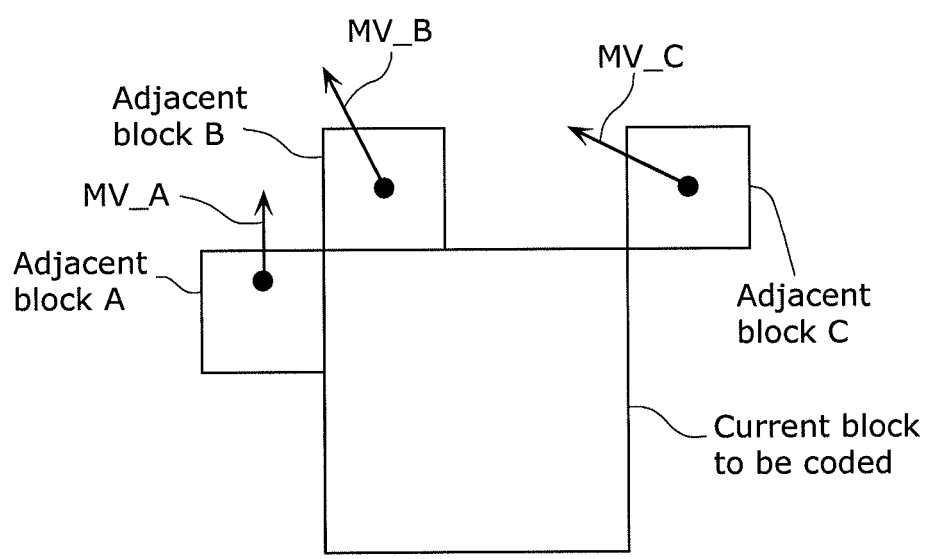
FIG. 3A illustrates an example of motion vector predictor candidates according to Embodiment 1.

FIG. 3A illustrates an example of motion vector predictor candidates. FIG. 3B shows an example of a motion vector predictor list indicating one-to-one correspondence between the motion vector predictor candidates and values of the motion vector predictor indexes. A motion vector A (MV_A) is a motion vector for an adjacent block A to the left of the current block. A motion vector B (MV_B) is a motion vector for an adjacent block B above the current block. A motion vector C (MV_C) is a motion vector for an adjacent block C to the upper right of the current block. Furthermore, Median (MV_A, MV_B, MV_C) indicates a median value of the motion vectors A, B, and C. Here, the median value is derived using Equations 1 to 3 below.

[Math. 1]

$$\text{Median}(x, y, z) = \qquad\qquad\text{(Equation 1)}$$
$$x + y + z - \text{Min}(x, \text{Min}(y, z)) - \text{Max}(x, \text{Max}(y, z))$$

$$\text{Min}(x, y) = \begin{cases} x & (x \le y) \\ y & (x > y) \end{cases} \qquad\text{(Equation 2)}$$

$$\text{Max}(x, y) = \begin{cases} x & (x \ge y) \\ y & (x < y) \end{cases} \qquad\text{(Equation 3)}$$

The value of the motion vector predictor index corresponding to Median (MV_A, MV_B, MV_C) is 0, the value corresponding to the motion vector A is 1, the value corresponding to MV_B is 2, the value corresponding to MV_C is 3, the value corresponding to the temporal direct vector 1 is 4, and the value corresponding to the temporal direct vector 2 is 5. The method of allocating a motion vector predictor index is not limited to this example. For example, examples of the method include a method of switching allocation of motion vector predictor indexes, according to a reference direction of the motion vector for the co-located block. FIGS. 3C to 3F show the specific examples.

FIG. 3C shows an example of allocation of motion vector predictor indexes, when the co-located block references the forward direction twice or the backward direction twice and a reference direction of each motion vector is identical to a direction of a picture including the current block. Here, "the co-located block references the forward direction twice" means that the co-located block has two forward reference motion vectors. Furthermore, the co-located block references "the backward direction twice" means that the co-located block has two backward reference motion vectors. Since the temporal direct vectors 1 and 2 calculated from the respective motion vectors probably have precision higher than those of the other motion vector predictor candidates, smaller motion vector predictor indexes are allocated to the temporal direct vectors 1 and 2 as shown in FIG. 3C.

FIG. 3D shows an example of allocation of motion vector predictor indexes, when the co-located block references the forward direction twice or the backward direction twice and a reference direction of each motion vector is opposite to the direction of the picture including the current block. Here, smaller motion vector predictor indexes are allocated to the other motion vector predictor candidates than to the temporal direct vectors 1 and 2 calculated from the respective motion vectors.

FIG. 3E shows an example of allocation of motion vector predictor indexes, when the co-located block has at least one of the forward reference motion vector and the backward reference motion vector and a reference direction of the motion vector is identical to the direction of the picture including the current block. Since the temporal direct vector 1 calculated from the motion vector probably have precision higher than those of the other motion vector predictor candidates, a smaller motion vector predictor index is allocated to the temporal direct vector 1 as shown in FIG. 3E.

FIG. 3F shows an example of allocation of motion vector predictor indexes, when the co-located block has at least one of the forward reference motion vector and the backward reference motion vector and a reference direction of the motion vector is opposite to the direction of the picture including the current block. Here, smaller motion vector predictor indexes are allocated to the other motion vector predictor candidates than to the temporal direct vector 1 calculated from the motion vector.

As such, the value of a motion vector predictor index for a motion vector predictor candidate probably having high prediction precision can be smaller by switching allocation of motion vector predictor indexes according to a reference direction of the motion vector for the co-located block. Thus, the coding efficiency can be increased.

FIG. 4 is an example code table for variable-length coding motion vector predictor indexes. In this example, a code with a shorter code length (bitstream) is allocated to each of the motion vector predictor indexes in ascending order. Thus, the coding efficiency can be increased by setting smaller a value of the motion vector predictor index corresponding to the motion vector predictor candidate that probably has high prediction precision.

Figure 5:
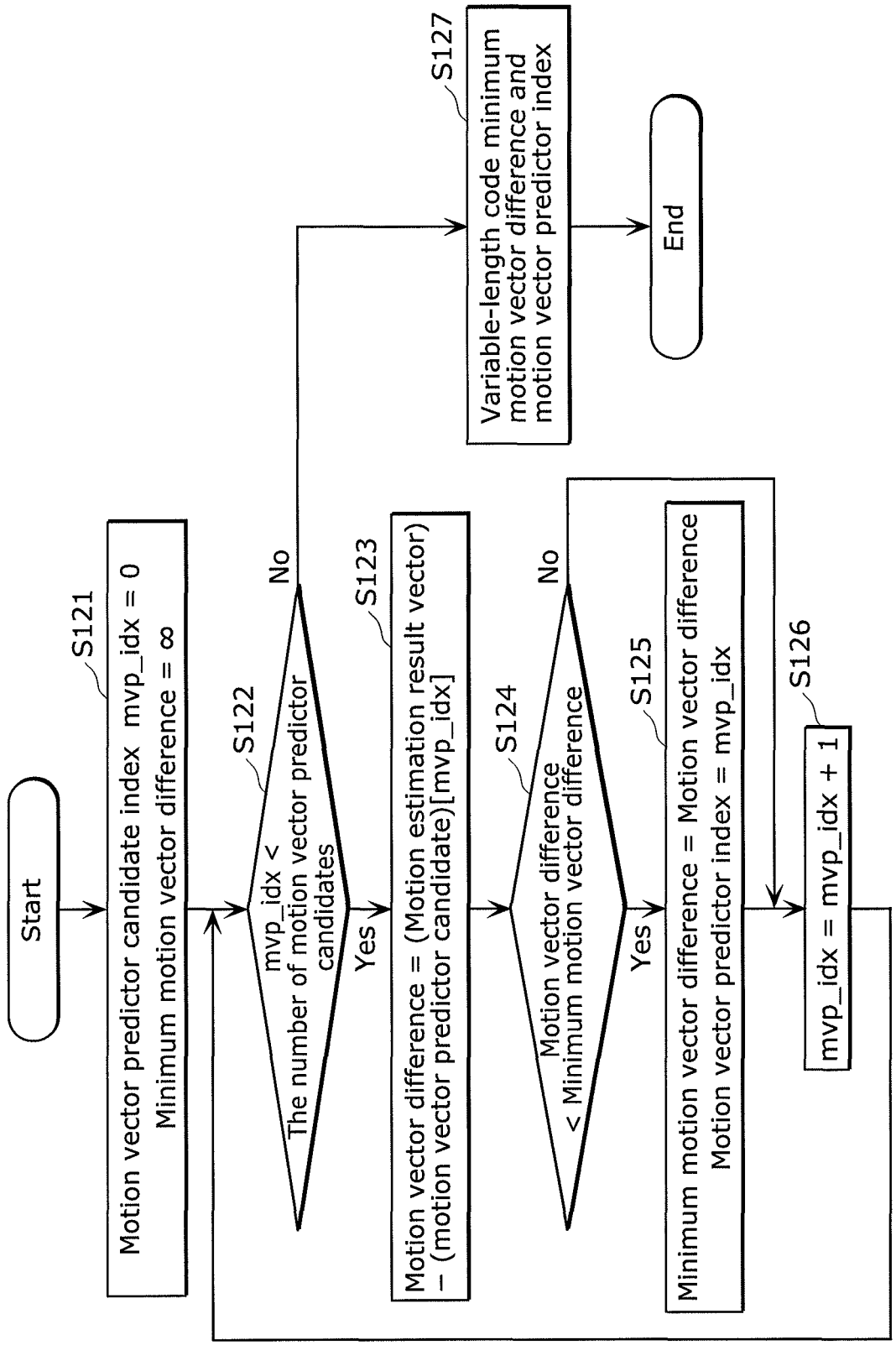
FIG. 5 is a flow chart indicating a procedure for determining a motion vector predictor candidate according to Embodiment 1.

FIG. 5 is a flow chart indicating a procedure of the inter prediction control unit 112 for determining a motion vector predictor candidate. According to the procedure in FIG. 5, the inter prediction control unit 112 determines a motion vector predictor candidate having the smallest difference with the motion vector derived from the motion estimation, as the motion vector predictor to be used in coding the motion vector. Then, the variable length coding unit 116 variable-length codes the difference information on the determined motion vector predictor candidate and the motion vector predictor index indicating the determined motion vector predictor.

Figure 6:
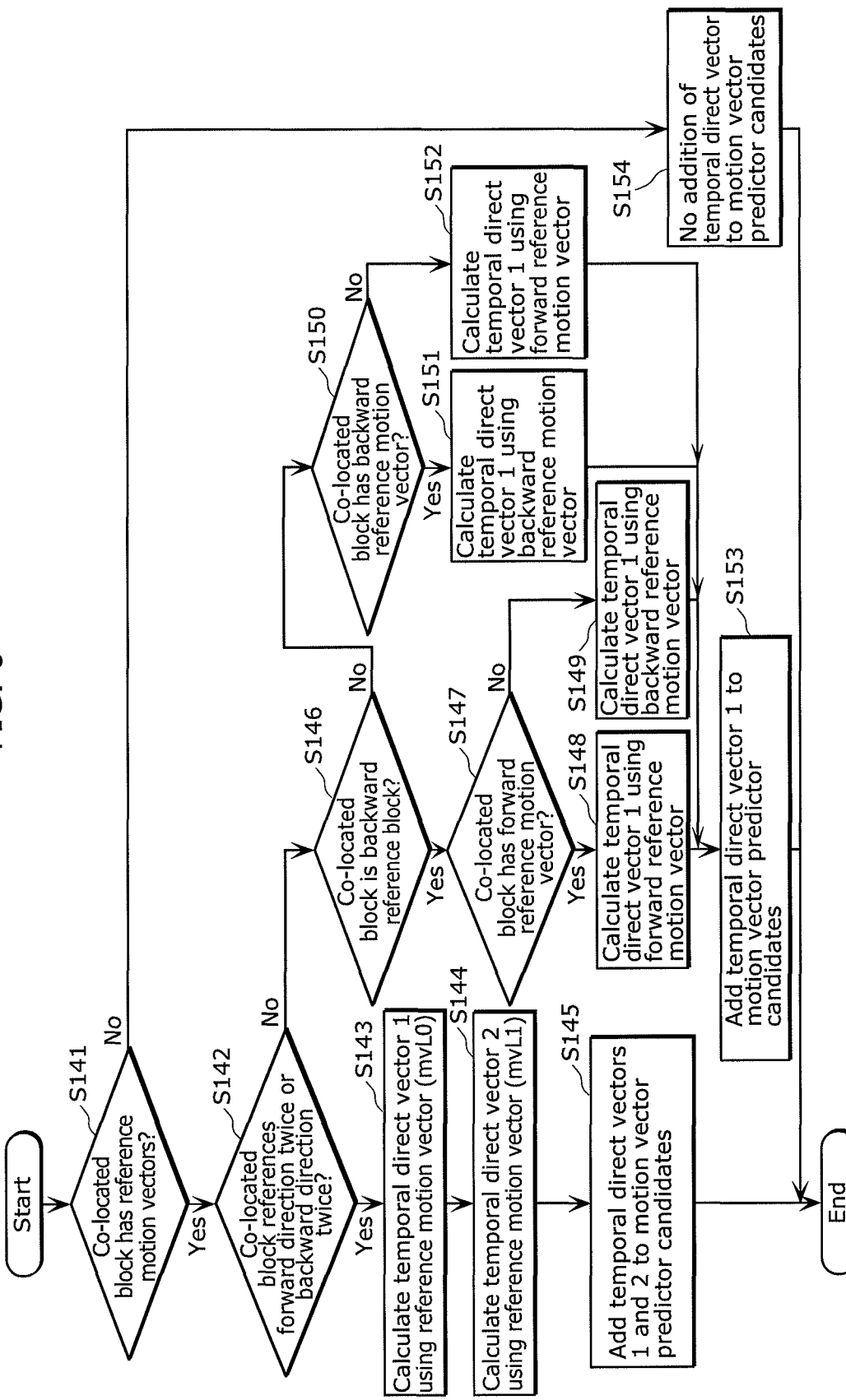
FIG. 6 is a flow chart of processes for calculating a temporal direct vector according to Embodiment 1.

FIG. 6 is a flow chart indicating a detailed procedure of the process of Step S102 in FIG. 2. FIG. 6 will be described hereinafter.

At Step S141, the temporal direct vector calculating unit 114 determines whether or not the co-located block has reference motion vectors.

When the temporal direct vector calculating unit 114 determines that the co-located block has reference motion vectors at Step S141 (Yes at S141), the processes proceed to Step S142. At Step S142, the temporal direct vector calculating unit 114 determines whether or not the co-located block references the forward direction twice or the backward direction twice. In other words, the temporal direct vector calculating unit 114 determines whether or not the co-located block has two reference motion vectors for referencing the same direction that is one of the forward direction and the backward direction in display order.

When the temporal direct vector calculating unit 114 determines that the co-located block references the forward direction twice or the backward direction twice at Step S142 (Yes at S142), the processes proceed to Step S143. At Step S143, the temporal direct vector calculating unit 114 derives, in the temporal direct mode, a motion vector predictor candidate (temporal direct vector 1) using the motion vector (mvL0) for the co-located block. Here, the motion vector (mvL0) is one of the two motion vectors for the co-located block for referencing the same direction. More specifically, the temporal direct vector calculating unit 114 calculates the motion vector predictor candidate (temporal direct vector 1) by scaling the motion vector (mvL0) for the co-located block.

At Step S144, the temporal direct vector calculating unit 114 derives, in the temporal direct mode, a motion vector predictor candidate (temporal direct vector 2) using the motion vector (mvL1) for the co-located block. Here, the motion vector (mvL1) is the other of the two motion vectors for the co-located block for referencing the same direction. More specifically, the temporal direct vector calculating unit 114 calculates the motion vector predictor candidate (temporal direct vector 2) by scaling the motion vector (mvL1) for the co-located block.

At Step S145, the temporal direct vector calculating unit 114 adds the temporal direct vectors 1 and 2 to motion vector predictor candidates.

When the temporal direct vector calculating unit 114 determines that the co-located block references neither the forward direction twice nor the backward direction twice at Step S142 (No at S142), the processes proceed to Step S146. At Step S146, the temporal direct vector calculating unit 114 determines whether or not the co-located block is a backward reference block.

When the temporal direct vector calculating unit 114 determines that the co-located block is a backward reference block at Step S146 (Yes at S146), the processes proceed to Step S147. At Step S147, the temporal direct vector calculating unit 114 determines whether or not the co-located block has a forward reference motion vector (mvL0).

When the temporal direct vector calculating unit 114 determines that the co-located block has the forward reference motion vector (mvL0) (Yes at S147), the processes proceed to Step S148. At Step S148, the temporal direct vector calculating unit 114 derives, in the temporal direct mode, the temporal direct vector 1 using the forward reference motion vector (mvL0).

When the temporal direct vector calculating unit 114 determines that the co-located block does not have the forward reference motion vector (mvL0) (No at S147), the processes proceed to Step S149. At Step S149, the temporal direct vector calculating unit 114 derives, in the temporal direct mode, the temporal direct vector 1 using the backward reference motion vector (mvL1) for the co-located block.

When the temporal direct vector calculating unit 114 determines that the co-located block is not a backward reference block, that is, the co-located block is a forward reference block at Step S146 (No at S146), the processes proceed to Step S150. At Step S150, the temporal direct vector calculating unit 114 determines whether or not the co-located block has the backward reference motion vector (mvL1).

When the temporal direct vector calculating unit 114 determines that the co-located block has the backward reference motion vector (mvL1) at Step S150 (Yes at S150), the processes proceed to Step S151. At Step S151, the temporal direct vector calculating unit 114 derives, in the temporal direct mode, a motion vector predictor candidate (temporal direct vector 1) using the backward reference motion vector (mvL1).

When the temporal direct vector calculating unit 114 determines that the co-located block does not have the backward reference motion vector (mvL1) at Step S150 (No at S150), the processes proceed to Step S152. At Step S512, the temporal direct vector calculating unit 114 derives, in the temporal direct mode, the temporal direct vector 1 using the forward reference motion vector (mvL0) for the co-located block.

At Step S153, the temporal direct vector 1 derived at one of Steps S148, S149, S151, and S152 is added to the motion vector predictor candidates.

When determining that the co-located block does not have the reference motion vectors (mvL0, mvL1) at Step S141 (No at S141), the temporal direct vector calculating unit 114 does not derive a motion vector predictor candidate in the temporal direct mode (S154).

Next, the method for deriving a motion vector in the temporal direct mode will be described in detail.

Figure 7A:
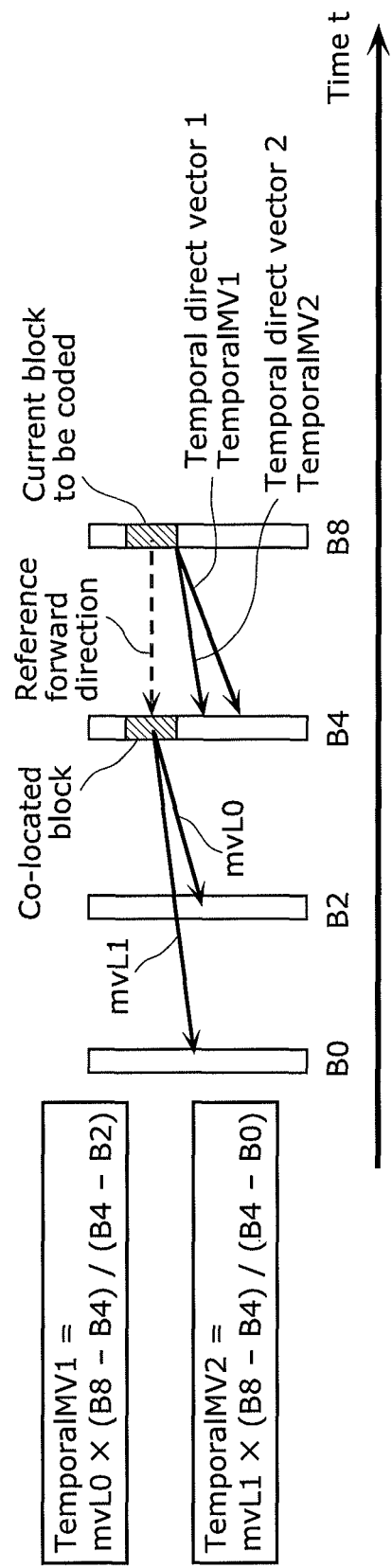
FIG. 7A illustrates a method for deriving a temporal direct vector according to Embodiment 1.

FIG. 7A illustrates, when the co-located block references the forward direction twice, that is, when the co-located block has two forward reference motion vectors (mvL0 and mvL1), a method for deriving motion vector predictor candidates (temporal direct vectors 1 and 2) using the two forward reference motion vectors in the temporal direct mode. The temporal direct vector calculating unit 114 derives motion vector predictor candidates (TemporalMV1 and TemporalMV2) using Equations 4 and 5 below.

$$TemporalMV1 = mvL0 \times (B8-B4)/(B4-B2) \quad \text{(Equation 4)}$$

$$TemporalMV2 = mvL1 \times (B8-B4)/(B4-B0) \quad \text{(Equation 5)}$$

Here, (B4–B0) is a temporal difference in display time between a picture B4 and a picture B0, and (B8–B4) is a temporal difference in display time between a picture B8 and the picture B4.

Figure 7B:
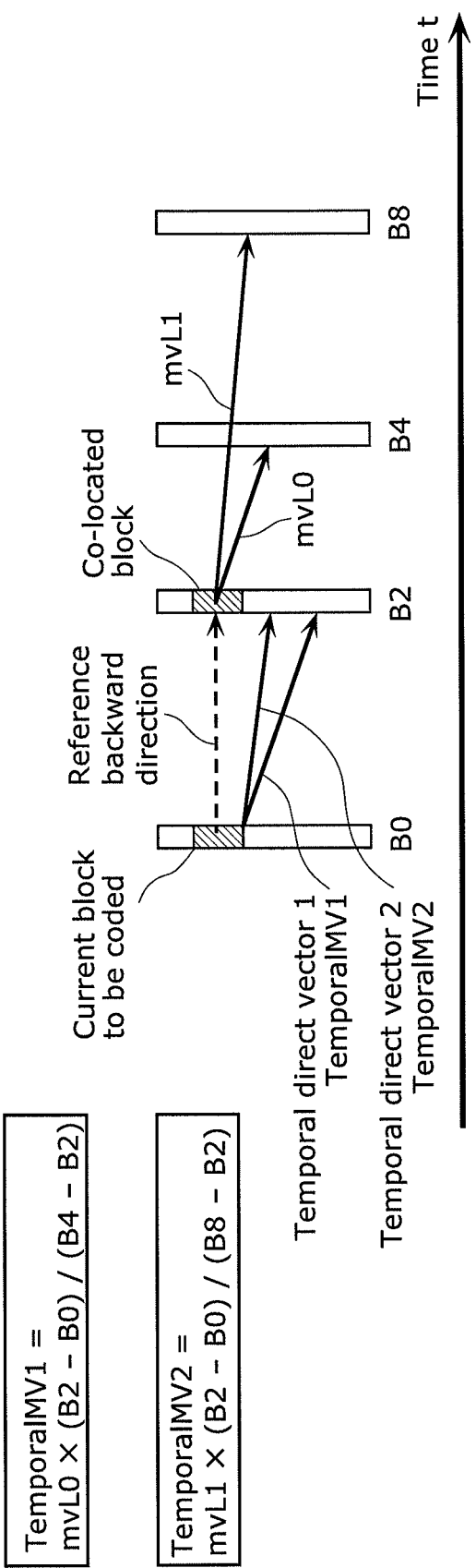
FIG. 7B illustrates a method for calculating a temporal direct vector according to Embodiment 1.

FIG. 7B illustrates, when the co-located block references the backward direction twice, that is, when the co-located block has two backward reference motion vectors (mvL0 and mvL1), a method for deriving motion vector predictor candidates (temporal direct vectors 1 and 2) using the two backward reference motion vectors in the temporal direct mode. The temporal direct vector calculating unit 114 derives motion vector predictor candidates (TemporalMV1 and TemporalMV2) using Equations 6 and 7 below.

$$TemporalMV1 = mvL0 \times (B2-B0)/(B4-B2) \quad \text{(Equation 6)}$$

$$TemporalMV2 = mvL1 \times (B2-B0)/(B8-B2) \quad \text{(Equation 7)}$$

Here, (B4–B2) is a temporal difference in display time between a picture B4 and a picture B2, and (B8–B2) is a temporal difference in display time between a picture B8 and the picture B2.

Figure 8A:
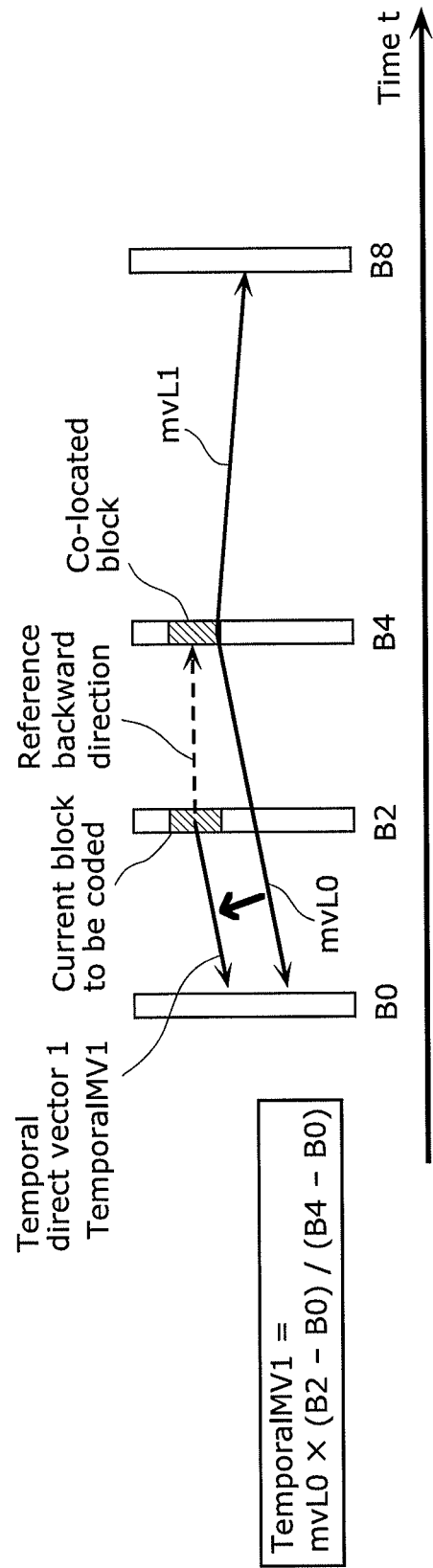
FIG. 8A illustrates a method for deriving a temporal direct vector according to Embodiment 1.

FIG. 8A illustrates, when the co-located block is a backward reference block and includes a forward reference motion vector and a backward reference motion vector, a method for deriving a motion vector predictor candidate (temporal direct vector 1) using the forward reference motion vector in the temporal direct mode. The temporal direct vector calculating unit 114 derives a motion vector predictor candidate (TemporalMV1) using the forward reference motion vector, using Equation 8 below.

$$TemporalMV1 = mvL0 \times (B2-B0)/(B4-B0) \quad \text{(Equation 8)}$$

Here, (B2–B0) is a temporal difference in display time between a picture B2 and a picture B0, and (B4–B0) is a temporal difference in display time between a picture B4 and the picture B0.

Figure 8B:
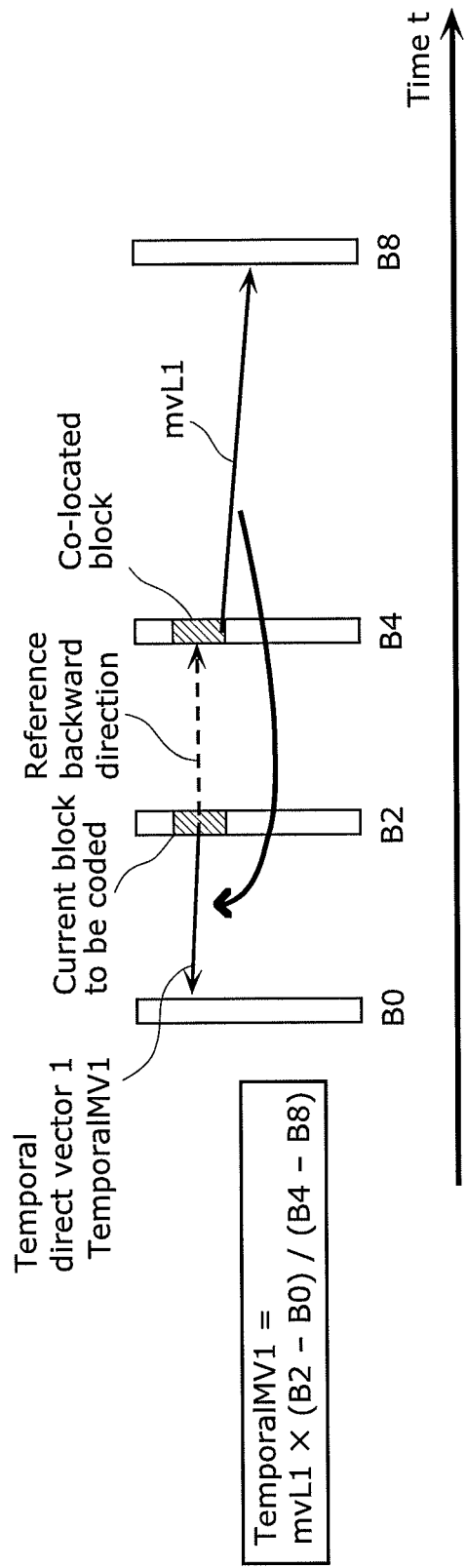
FIG. 8B illustrates a method for calculating a temporal direct vector according to Embodiment 1.

FIG. 8B illustrates, when the co-located block is a backward reference block and only includes a backward reference motion vector, a method for deriving a motion vector predictor candidate (temporal direct vector 1) using the backward reference motion vector in the temporal direct mode. The temporal direct vector calculating unit 114 derives a motion vector predictor candidate using the backward reference motion vector, using Equation 9 below.

$$TemporalMV1 = mvL1 \times (B2-B0)/(B4-B8) \quad \text{(Equation 9)}$$

Figure 9A:
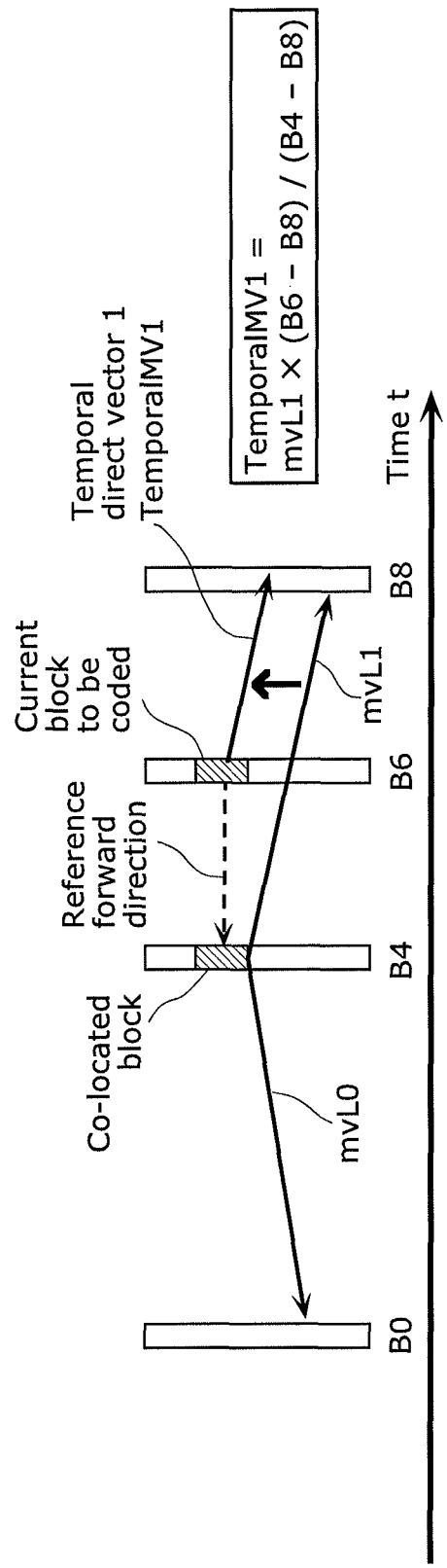
FIG. 9A illustrates a method for deriving a temporal direct vector according to Embodiment 1.

FIG. 9A illustrates, when the co-located block is a forward reference block and includes a forward reference motion vector and a backward reference motion vector, a method for deriving a motion vector predictor candidate (temporal direct vector 1) using the backward reference motion vector in the temporal direct mode. The temporal direct vector calculating unit 114 derives a motion vector predictor candidate using the backward reference motion vector, using Equation 10 below.

$$TemporalMV = mvL1 \times (B6-B8)/(B4-B8) \quad \text{(Equation 10)}$$

Figure 9B:
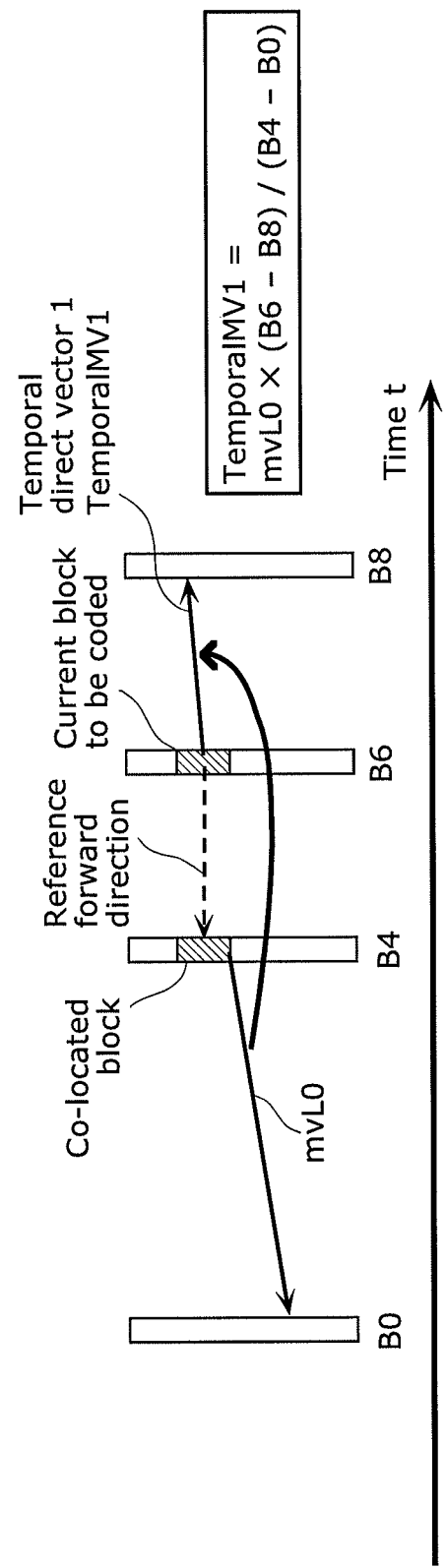
FIG. 9B illustrates a method for calculating a temporal direct vector according to Embodiment 1.

FIG. 9B illustrates, when the co-located block is a forward reference block and only includes the forward reference motion vector, a method for deriving a motion vector predictor candidate (temporal direct vector 1) using the forward reference motion vector in the temporal direct mode. The temporal direct vector calculating unit 114 derives a motion vector predictor candidate using the forward reference motion vector, using Equation 11 below.

$$TemporalMV1 = mvL0 \times (B6-B8)/(B4-B0) \quad \text{(Equation 11)}$$

As such, the moving picture coding method according to Embodiment 1 can increase the coding efficiency using one of motion vector predictor candidates having the smallest difference value in coding a motion vector. For example, the difference is a difference value between a motion vector predictor candidate and the motion vector derived from the motion estimation.

Furthermore, the moving picture coding method enables narrowing down motion vector predictor candidates with higher precision, by selecting reference motion vectors for the co-located block used in the temporal direct mode according to the position of the co-located block and the number of the reference motion vectors for the co-located block. Accordingly, the moving picture coding method can reduce the processing load in coding and decoding.

More specifically, when the co-located block references the forward direction twice or the backward direction twice, it is highly likely that the motion vector predictor candidates (temporal direct vectors 1 and 2) derived in the temporal direct mode using the two motion vectors for the co-located block approximate in precision. In such a case, both of the temporal direct vectors 1 and 2 are determined to be the motion vector predictor candidates in the moving picture coding method.

When the co-located block has the forward reference motion vector and the backward reference motion vector, the motion vector to be used in the temporal direct mode is selected according to the position of the co-located block in the moving picture coding method.

More specifically, when the co-located block is a backward reference block, the forward reference motion vector is used in the moving picture coding method. Here, the forward reference motion vector is a motion vector in a direction from a picture including the co-located block to a picture including the current block. Thus, it is highly likely that the forward reference motion vector has less prediction error than that of the backward reference motion vector.

On the other hand, when the co-located block is a forward reference block, the backward reference motion vector is used in the moving picture coding method. Here, the backward reference motion vector is a motion vector in a direction from a picture including the co-located block to a picture including the current block. Thus, it is highly likely that the backward reference motion vector has less prediction error than that of forward reference motion vector.

Although the moving picture coding apparatus 100 determines whether or not the co-located block references the forward direction twice or the backward direction twice, it may further determine the position of the co-located block simultaneously according to Embodiment 1. More specifically, at Step S142 in FIG. 6, the temporal direct vector calculating unit 114 may determine whether or not the co-located block is a forward reference block and references the forward direction twice. Alternatively, the temporal direct vector calculating unit 114 may determine whether or not the co-located block is a backward reference block and references the backward direction twice. When the co-located block is a backward reference block, the backward reference motion vector is a motion vector in a direction opposite to a direction from a picture including the co-located block to a picture including the current block. Thus, the prediction precision becomes lower. In such a case, the moving picture coding apparatus 100 can increase the prediction precision by deriving both of the temporal direct vectors 1 and 2. As such, only when the prediction precision is lower, the moving picture coding apparatus 100 calculates the temporal direct vectors 1 and 2 so as to suppress the processing amount and increase the prediction precision.

Furthermore, when the co-located block does not have any reference motion vector, the moving picture coding apparatus 100 does not calculate any temporal direct vector in FIG. 6. However, the moving picture coding apparatus 100 can calculate the temporal direct vector using another block as the co-located block.

For example, when the co-located block is a backward reference block and does not have any reference motion vector, a method using the forward reference block as the co-located block will be used. Here, the moving picture coding apparatus 100 can increase the prediction precision, using the backward reference motion vector in display order among the reference motion vectors for the forward reference blocks. Furthermore, when the forward reference block does not have any backward reference motion vector in display order, the moving picture coding apparatus 100 can derive a temporal direct vector using a forward reference motion vector in display order.

Similarly, when the co-located block is a forward reference block and does not have any reference motion vector, a method using the backward reference block as the co-located block will be used. Here, the moving picture coding apparatus 100 can increase the prediction precision using the forward reference motion vector in display order among the reference motion vectors for the backward reference blocks. Furthermore, when the backward reference block does not have any forward reference motion vector in display order, the moving picture coding apparatus 100 can derive a temporal direct vector using a backward reference motion vector in display order.

One of the blocks in a picture indicated by an index 0 in the reference list L0 for the current picture is used as the co-located block. Thus, when the co-located block identified by the index 0 in the reference list L0 does not have any reference motion vector, a method using a reference motion vector for the co-located block identified by an index 0 in a reference list L1 will be used.

Although Embodiment 1 describes a method for calculating a temporal direct vector as one of motion vector predictor candidates used in coding the motion vector derived from the motion estimation, the present invention is not limited to such a method.

Examples of a coding mode for performing inter prediction on the current block in a B-picture or a P-picture in accordance with H.264 include a direct mode and a skip mode. Here, the direct mode is a mode in which only a difference value between image data items is coded and a motion vector is predicted from the surrounding blocks. Furthermore, the skip mode is a mode in which the predicted image in a position indicated by the motion vector predicted from the surrounding blocks is used as a decoded image without coding a difference value between image data items and a motion vector. In the direct mode and the skip mode, the temporal direct vector calculated in the similar method is applicable as a motion vector predictor.

Furthermore, examples of an inter prediction mode for each of the current blocks in the B-picture and the P-picture include a merge mode. The merge mode is a mode in which the motion vector and the reference picture index of the current block are copied from the adjacent blocks or the co-located block of the current block and the current block is coded using the copied information. In the merge mode, the motion vector and the reference picture index of the current block can be selected by attaching the indexes of the adjacent blocks used in the copying to the bitstream. In such a merge mode, the temporal direct vector calculated in the similar method is applicable as a motion vector predictor of the co-located block.

Embodiment 2

Figure 10:
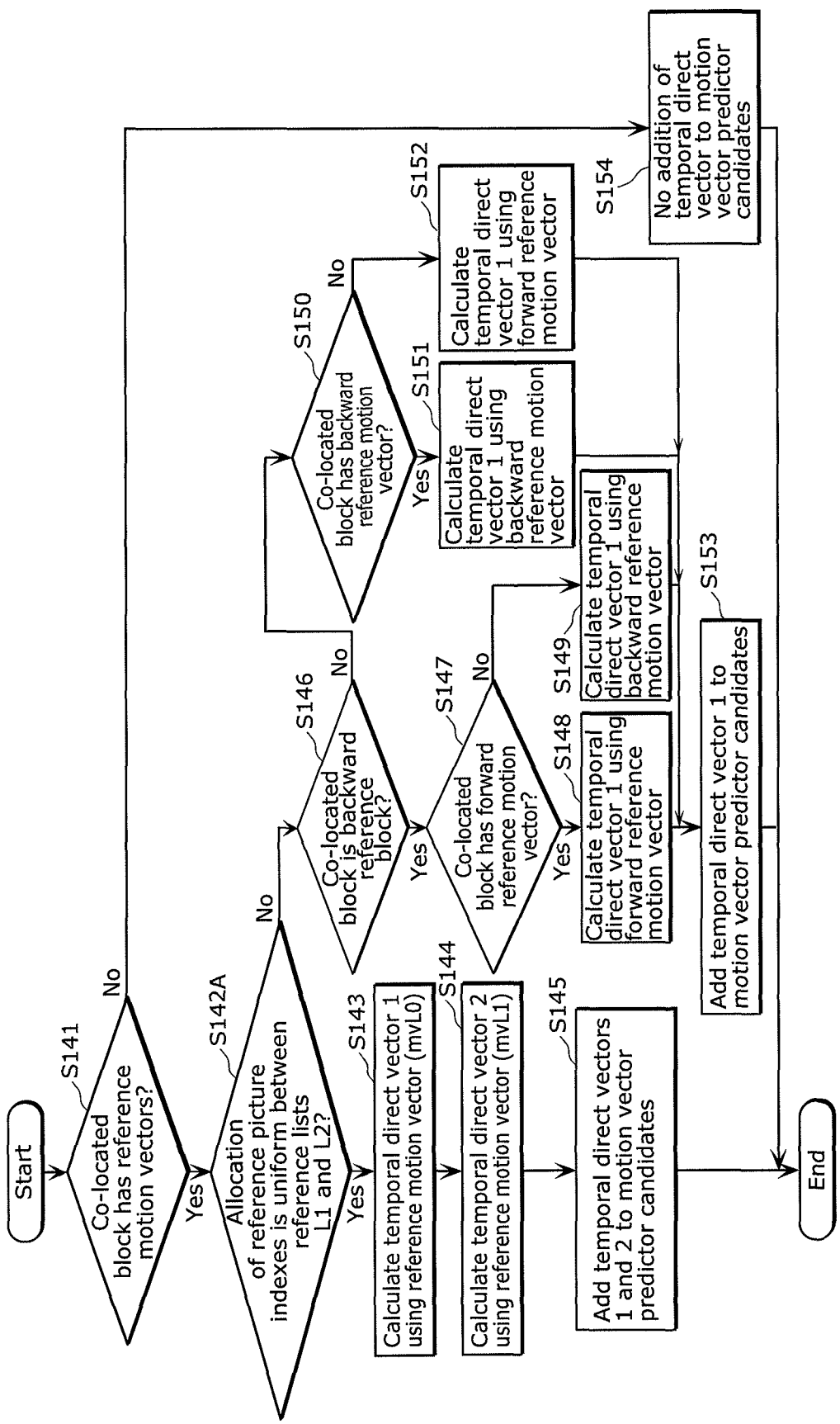
FIG. 10 is a flow chart of processes for calculating a temporal direct vector according to Embodiment 2 in the present invention.

Embodiment 2 will describe variations of processing for calculating a temporal direct vector in FIG. 6. FIG. 10 is a flow chart of processes for calculating a temporal direct vector according to Embodiment 2. In the processes of FIG. 10, Step S142A differs from Step S142 in FIG. 6. The differences with Embodiment 1 will be mainly described hereinafter.

At Step S142A in FIG. 10, the temporal direct vector calculating unit 114 determines whether or not allocation of reference picture indexes to reference pictures is uniform between reference lists L1 and L2. Typically, in the reference list L2, a reference picture index is allocated to a picture following the current picture in display time order. In contrast, in the reference list L1, a reference picture index is allocated to a picture preceding the current picture in display time order. Thus, when the allocation of reference picture indexes to reference pictures is uniform between the reference lists L1 and L2, the reference direction is limited to one of the forward direction and the backward direction with respect to the current picture in display order.

When it is determined that the allocation of reference picture indexes to reference pictures is uniform between the reference lists L1 and L2 at Step S142A (Yes at S142A), the temporal direct vectors 1 and 2 are derived, in the temporal direct mode, using the reference motion vectors mvL0 and mvL1 of the co-located block at Steps S143 and S144. Here, the reference motion vectors mvL0 and mvL1 approximate in the prediction precision because they are in the same reference direction. Thus, the prediction precision can be increased by adding the temporal direct vectors 1 and 2 to the motion vector predictor candidates.

Furthermore, when the co-located block includes only one of the reference motion vectors mvL0 and mvL1, the temporal direct vector calculating unit 114 derives the temporal direct vector 1 using the one in the temporal direct mode. In other words, the temporal direct vector calculating unit 114 performs only one of Steps S143 and S144.

Since the processes after Step S146 are the same as those according to Embodiment 1, the description is omitted.

As such, the moving picture coding method according to Embodiment 2 enables reduction of the processing amount in coding and decoding by making such determination based on a reference list. More specifically, the reference list is provided for each picture. Thus, the determination has only to be made per picture, not per block. Accordingly, the moving picture coding method can reduce the processing amount.

Embodiment 3

Embodiment 3 will describe a moving picture decoding method and a moving picture decoding apparatus for decoding a bitstream generated in the moving picture coding method.

Figure 11:
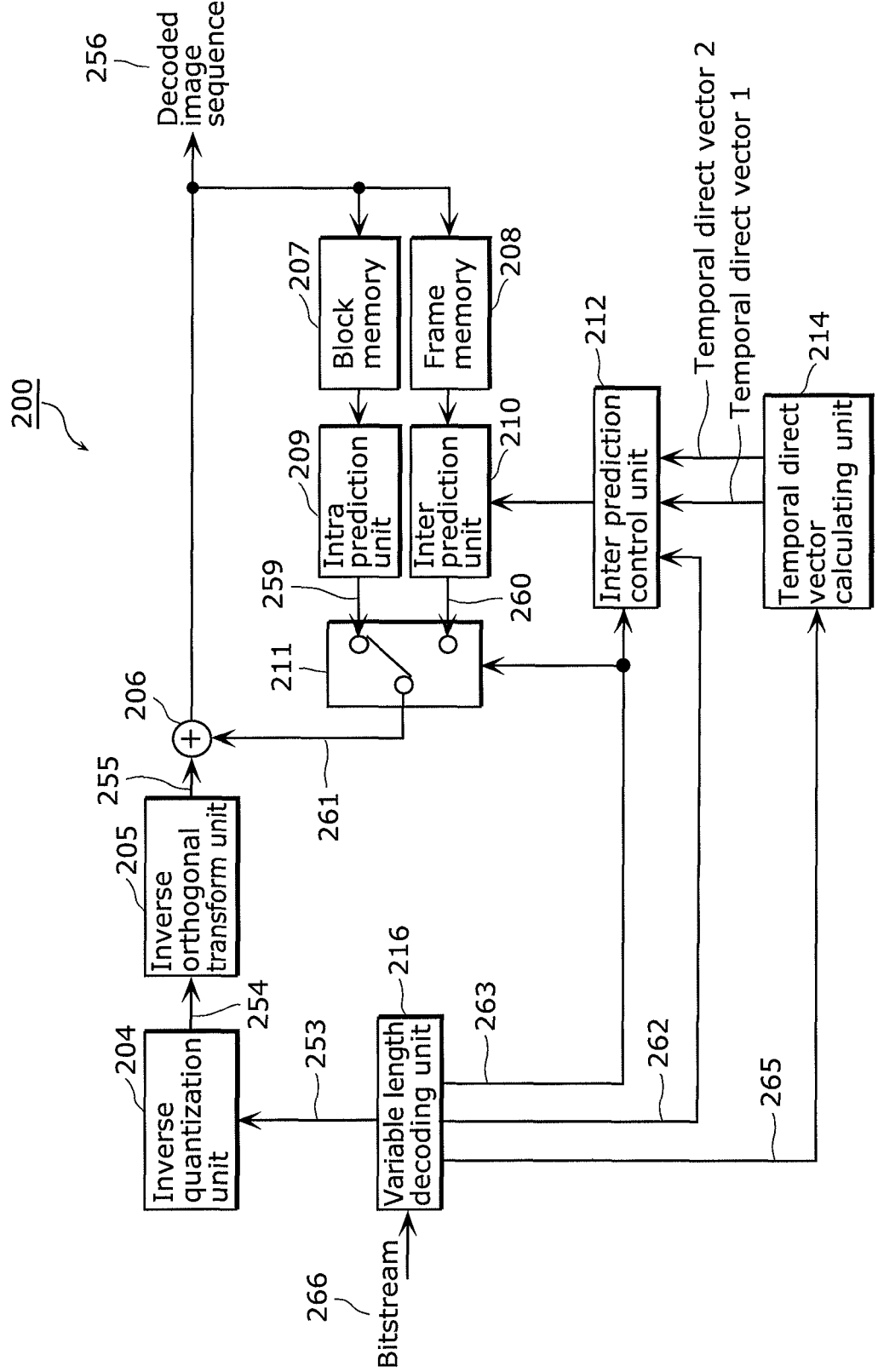
FIG. 11 is a block diagram of a moving picture decoding apparatus according to Embodiment 3 in the present invention.

FIG. 11 is a block diagram illustrating a configuration of a moving picture decoding apparatus using a moving picture decoding method according to Embodiment 3.

In Embodiment 3, a block included in a picture preceding the current picture to be decoded in display time order will be referred to as a forward reference block. Furthermore, a block included in a picture following the current picture in display time order will be referred to as a backward reference block.

A moving picture decoding apparatus 200 decodes a bitstream 266 to generate a decoded image sequence 256. Here, the bitstream 266 is, for example, the bitstream 166 generated by the moving picture coding apparatus 100.

As illustrated in FIG. 11, the moving picture decoding apparatus 200 includes a variable length decoding unit 216, an inverse quantization unit 204, an inverse orthogonal transform unit 205, an adder 206, a block memory 207, a frame memory 208, an intra prediction unit 209, an inter prediction unit 210, a switch 211, an inter prediction control unit 212, and a temporal direct vector calculating unit 214.

The variable length decoding unit 216 variable-length decodes the input bitstream 266 to generate picture type information 263, a motion vector predictor index 262, a co-located reference direction flag 265, and a bitstream that is variable-length decoded (quantized coefficients 253).

The inverse quantization unit 204 inversely quantizes the quantized coefficients 253 to generate a coefficient block 254. The inverse orthogonal transform unit 205 transforms the coefficient block 254 from a frequency domain to an image domain to generate a decoded difference image 255. The adder 206 adds a predicted image 261 to the decoded difference image 255 to generate the decoded image sequence 256.

The block memory 207 stores the decoded image sequence 256 per block. The frame memory 208 stores the decoded image sequence 256 per frame.

The intra prediction unit 209 performs intra-prediction using the decoded image sequence 256 stored per block in the block memory 207 to generate a predicted image 259 of the current block. The inter prediction unit 210 performs inter-prediction on the decoded image sequence 256 stored per frame in the frame memory 208 to generate a predicted image 260 of the current block.

When the intra-prediction coding is performed on the current block, the switch 211 selects the predicted image 259. When the inter-prediction coding is performed on the current block, the switch 211 selects the predicted image 260. Then, the switch 211 outputs the selected predicted image as the predicted image 261.

The temporal direct vector calculating unit 214 derives, in the temporal direct mode, a motion vector predictor candidate using the reference motion vector for the co-located block. The processing performed by the temporal direct vector calculating unit 214 is the same as that performed by the temporal direct vector calculating unit 114 except in which the co-located reference direction flag 165 is replaced with the co-located reference direction flag 265.

More specifically, when the co-located block has two forward reference motion vectors or two backward reference motion vectors, the temporal direct vector calculating unit 214 derives, in the temporal direct mode, motion vector predictor candidates (temporal direct vectors 1 and 2) using the two motion vectors for the co-located block. Furthermore, the temporal direct vector calculating unit 214 allocates a value of a corresponding motion vector predictor index to each of the temporal direct vectors 1 and 2.

Furthermore, when the co-located block has neither the two forward reference motion vectors nor the two backward reference motion vectors, the temporal direct vector calculating unit 214 determines a motion vector for the co-located block to be used in the temporal direct mode, according to whether the co-located block is a forward reference block or a backward reference block. More specifically, when the co-located block is a backward reference block, the temporal direct vector calculating unit 214 derives, in the temporal direct mode, a motion vector predictor candidate (temporal direct vector 1) using the forward reference motion vector for the co-located block. Furthermore, when the co-located block does not have a forward reference motion vector, the temporal direct vector calculating unit 214 derives, in the temporal direct mode, a motion vector predictor candidate (temporal direct vector 1) using the backward reference motion vector for the co-located block.

When the co-located block is a forward reference block, the temporal direct vector calculating unit 214 derives, in the temporal direct mode, a motion vector predictor candidate (temporal direct vector 1) using the backward reference motion vector for the co-located block. Furthermore, when the co-located block does not have a backward reference motion vector, the temporal direct vector calculating unit 214 derives, in the temporal direct mode, a motion vector predictor candidate (temporal direct vector 1) using the forward reference motion vector for the co-located block.

The inter prediction control unit 212 generates a motion vector predictor list indicating one-to-one correspondence between the motion vector predictor candidates and values of the motion vector predictor indexes. Then, the inter prediction control unit 212 determines a motion vector to be used in inter prediction among the motion vector predictor candidates, based on the motion vector predictor index. Furthermore, the inter prediction control unit 212 calculates the motion vector to be used in inter prediction by adding the prediction error information on the motion vector predictor candidate to the value of the determined motion vector predictor candidate. More specifically, the inter prediction control unit 212 calculates the motion vector by adding, to the difference value information, a motion vector predictor candidate identified by the motion vector predictor index having a value identical to that of the index information (motion vector predictor index 262) among the motion vector predictor candidates indicated in the motion vector predictor list.

The temporal direct vector calculating unit 214 is an example of a determining unit and a first calculating unit according to the present invention, the inter prediction control unit 212 is an example of a generating unit and a second calculating unit according to the present invention, and the variable length decoding unit 216 is an example of first to third decoding units according to the present invention.

Figure 12:
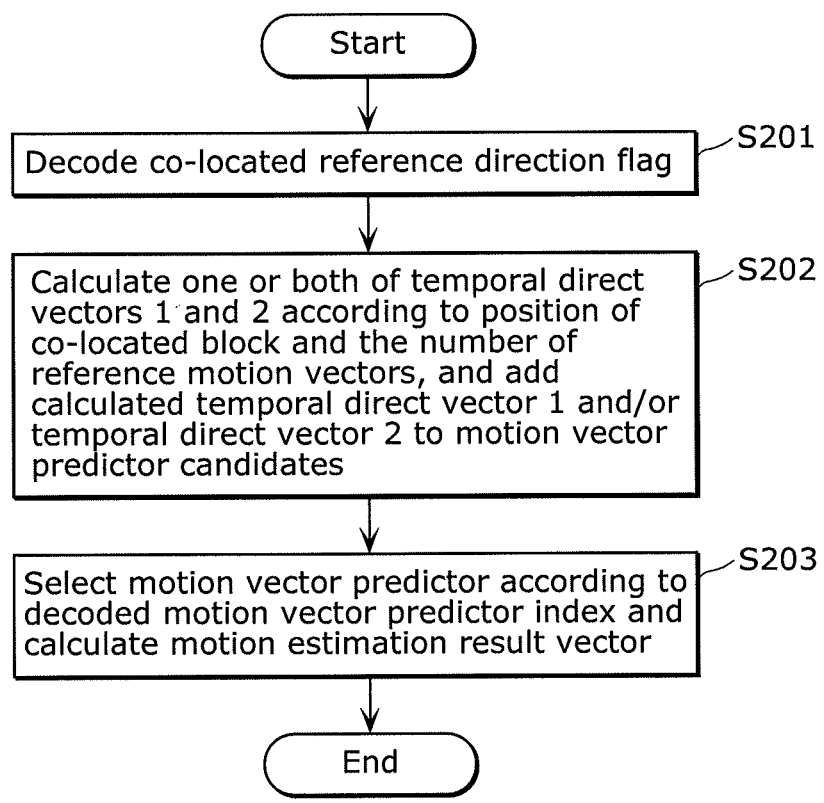
FIG. 12 is a flow chart of a moving picture decoding method according to Embodiment 3.
Figure 14:
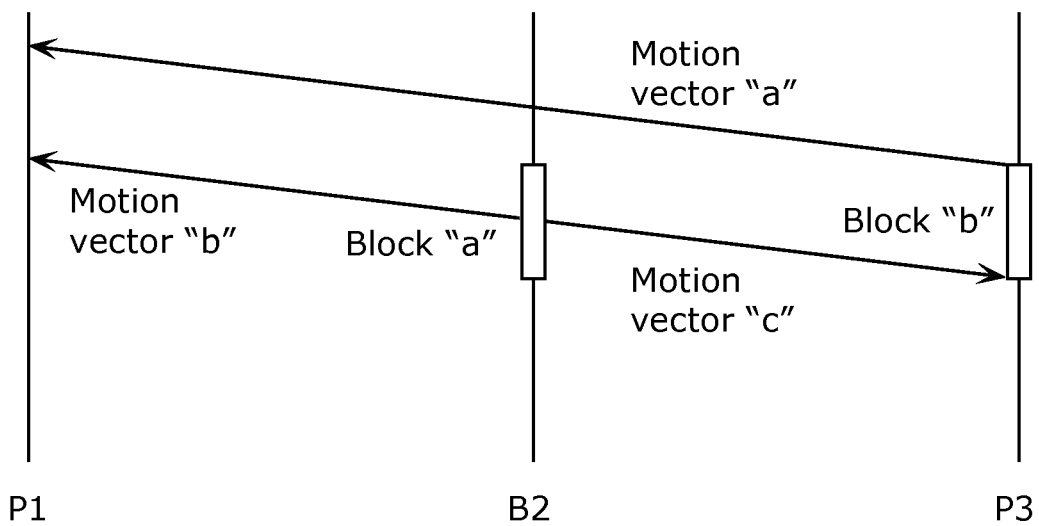
FIG. 14 illustrates motion vectors in a temporal direct mode.

FIG. 12 is an outline procedure of processes of the moving picture decoding method according to Embodiment 3.

At Step S201, the variable length decoding unit 216 decodes the co-located reference direction flag 265 per picture. Then, the temporal direct vector calculating unit 214 determines whether the forward reference block or the backward reference block is used as a co-located block, based on the co-located reference direction flag 265 obtained by the decoding.

At Step S202, the temporal direct vector calculating unit 214 derives, in the temporal direct mode, a motion vector predictor candidate using reference motion vectors for the co-located block. More specifically, when the co-located block has two forward reference motion vectors or two backward reference motion vectors, the temporal direct vector calculating unit 214 derives, in the temporal direct mode, motion vector predictor candidates (temporal direct vectors 1 and 2) using the two motion vectors for the co-located block.

Furthermore, the temporal direct vector calculating unit 214 allocates a value of a corresponding motion vector predictor index to each of the temporal direct vectors 1 and 2. The allocation of motion vector predictor indexes follows the method according to Embodiment 1.

Furthermore, when the co-located block has neither the two forward reference motion vectors nor the two backward reference motion vectors, the temporal direct vector calculating unit 214 determines a motion vector for the co-located block to be used in the temporal direct mode, according to whether the co-located block is a forward reference block or a backward reference block.

More specifically, when the co-located block is a backward reference block, the temporal direct vector calculating unit 214 derives, in the temporal direct mode, a motion vector predictor candidate (temporal direct vector 1) using the forward reference motion vector for the co-located block. Furthermore, when the co-located block does not have a forward reference motion vector, the temporal direct vector calculating unit 214 derives, in the temporal direct mode, a motion vector predictor candidate (temporal direct vector 1) using the backward reference motion vector for the co-located block.

When the co-located block is a forward reference block, the temporal direct vector calculating unit 214 derives, in the temporal direct mode, a motion vector predictor candidate (temporal direct vector 1) using the backward reference motion vector for the co-located block. Furthermore, when the co-located block does not have a backward reference motion vector, the temporal direct vector calculating unit 214 derives, in the temporal direct mode, a motion vector predictor candidate (temporal direct vector 1) using the forward reference motion vector for the co-located block.

At Step S203, the inter prediction control unit 212 determines a motion vector to be used in inter prediction among the motion vector predictor candidates, based on the motion vector predictor index. Furthermore, the inter prediction control unit 212 derives the motion vector by adding the prediction error information to the determined motion vector predictor candidate. Then, the moving picture decoding apparatus 200 performs inter-prediction decoding using the derived motion vector.

Since the moving picture decoding method according to Embodiment 3 can select the optimal motion vector for the current block, the bitstream compressed at a higher efficiency can be appropriately decoded.

Furthermore, the moving picture decoding method enables narrowing down motion vector predictor candidates with higher precision by selecting reference motion vectors for the co-located block used in the temporal direct mode, according to the position of the co-located block and the number of the reference motion vectors for the co-located block. Accordingly, the moving picture decoding method can reduce the processing load.

More specifically, when the co-located block references the forward direction twice or the backward direction twice, it is highly likely that the motion vector predictor candidates (temporal direct vectors 1 and 2) derived in the temporal direct mode using the two motion vectors for the co-located block approximate in precision. In such a case, both of the temporal direct vectors 1 and 2 are determined to be the motion vector predictor candidates in the moving picture decoding method.

When the co-located block has the forward reference motion vector and the backward reference motion vector, the motion vector to be used in the temporal direct mode is selected according to the position of the co-located block in the moving picture decoding method.

More specifically, when the co-located block is a backward reference block, the forward reference motion vector is used in the moving picture decoding method. Here, the forward reference motion vector is a motion vector in a direction from a picture including the co-located block to a picture including the current block. Thus, it is highly likely that the forward reference motion vector has less prediction error than that of the backward reference motion vector.

On the other hand, when the co-located block is a forward reference block, the backward reference motion vector is used in the moving picture decoding method. Here, the backward reference motion vector is a motion vector in a direction from a picture including the co-located block to a picture including the current block. Thus, it is highly likely that the backward reference motion vector has less prediction error than that of the forward reference motion vector.

Although the moving picture decoding apparatus 200 determines whether or not the co-located block references the forward direction twice or the backward direction twice, it may further determine the position of the co-located block simultaneously according to Embodiment 3. More specifically, the temporal direct vector calculating unit 214 may determine whether or not the co-located block references the forward direction twice when the co-located block is a forward reference block. Alternatively, the temporal direct vector calculating unit 214 may determine whether or not the co-located block references the backward direction twice when the co-located block is a backward reference block. When the co-located block is the backward reference block, the backward reference motion vector is a motion vector in a direction opposite to the direction from the picture including the co-located block to the picture including the current block. Thus, the prediction precision becomes lower. In such a case, the moving picture decoding apparatus 200 can increase the prediction precision by deriving both of the temporal direct vectors 1 and 2. As such, the moving picture decoding apparatus 200 can suppress the processing amount while increasing the prediction precision by calculating the temporal direct vectors 1 and 2 only when the prediction precision is lower.

Furthermore, the moving picture decoding apparatus 200 may determine whether or not allocation of reference picture indexes to reference pictures is uniform between reference lists L1 and L2 instead of the determination of whether or not the co-located block references the forward direction twice or the backward direction twice, as according to Embodiment 2. Typically, in the reference list L2, a reference picture index is allocated to a picture following the current picture in display time order. In contrast, in the reference list L1, a reference picture index is allocated to a picture preceding the current picture in display time order. Thus, when the allocation of reference picture indexes to reference pictures is uniform between the reference lists L1 and L2, the reference direction is limited to one of the forward direction and the backward direction with respect to the current picture in display order. As such, the moving picture decoding apparatus 200 can reduce the processing amount by making the determination based on a reference list. Because the reference list is provided for each picture. Thus, the determination has only to be made per picture, not per block.

Furthermore, when the co-located block does not have any reference motion vector, the moving picture decoding apparatus 200 can calculate the temporal direct vector using another block as the co-located block. For example, when the co-located block is a backward reference block and does not have any reference motion vector, a method using the forward reference block as the co-located block will be used. Here, the moving picture decoding apparatus 200 can increase the prediction precision, using the backward reference motion vector in display order among the reference motion vectors for the forward reference blocks. Furthermore, when the forward reference blocks do not include the backward reference motion vector in display order, the moving picture decoding apparatus 200 can derive a temporal direct vector using the forward reference motion vector in display order.

On the other hand, when the co-located block is a forward reference block and does not have any reference motion vector, a method using the backward reference block as the co-located block will be used. Here, the moving picture decoding apparatus 200 can increase the prediction precision, using the forward reference motion vector in display order among the reference motion vectors for the backward reference blocks. Furthermore, when the backward reference blocks do not include the forward reference motion vector in display order, the moving picture decoding apparatus 200 can derive a temporal direct vector using the backward reference motion vector in display order.

One of the blocks in a picture indicated by an index 0 in the reference list L0 for the current picture is used as the co-located block. Thus, when the co-located block identified by the index 0 in the reference list L0 does not have any reference motion vector, a method using a reference motion vector for the co-located block identified by an index 0 in a reference list L1 will be used.

Although the moving picture coding method, the moving picture coding apparatus, the moving picture decoding method, and the moving picture decoding apparatus according to Embodiments 1 to 3 in the present invention are described, the present invention is not limited by these Embodiments.

For example, at least part of the moving picture coding method, the moving picture coding apparatus, the moving picture decoding method, and the moving picture decoding apparatus and functions of the modifications according to Embodiments 1 to 3 may be combined.

Embodiment 4

The processing described in each of Embodiments can be simply implemented by recording, onto a recording medium, a program for implementing a moving picture coding method (image coding method) or a moving picture decoding method (image decoding method) described in each of Embodiments. The recording medium may be any recording medium as long as a program can be recorded thereon, such as a magnetic disk, an optical disc, a magnetic optical disc, an IC card, and a semiconductor memory.

Hereinafter, the applications to the moving picture coding method (image coding method) and the moving picture decoding method (image decoding method) described in each of Embodiments and a system using thereof will be described. The system includes an image coding and decoding apparatus including an image coding apparatus using an image coding method and an image decoding apparatus using an image decoding method. Other configurations in the system can be appropriately changed according to each individual case.

Figure 15:
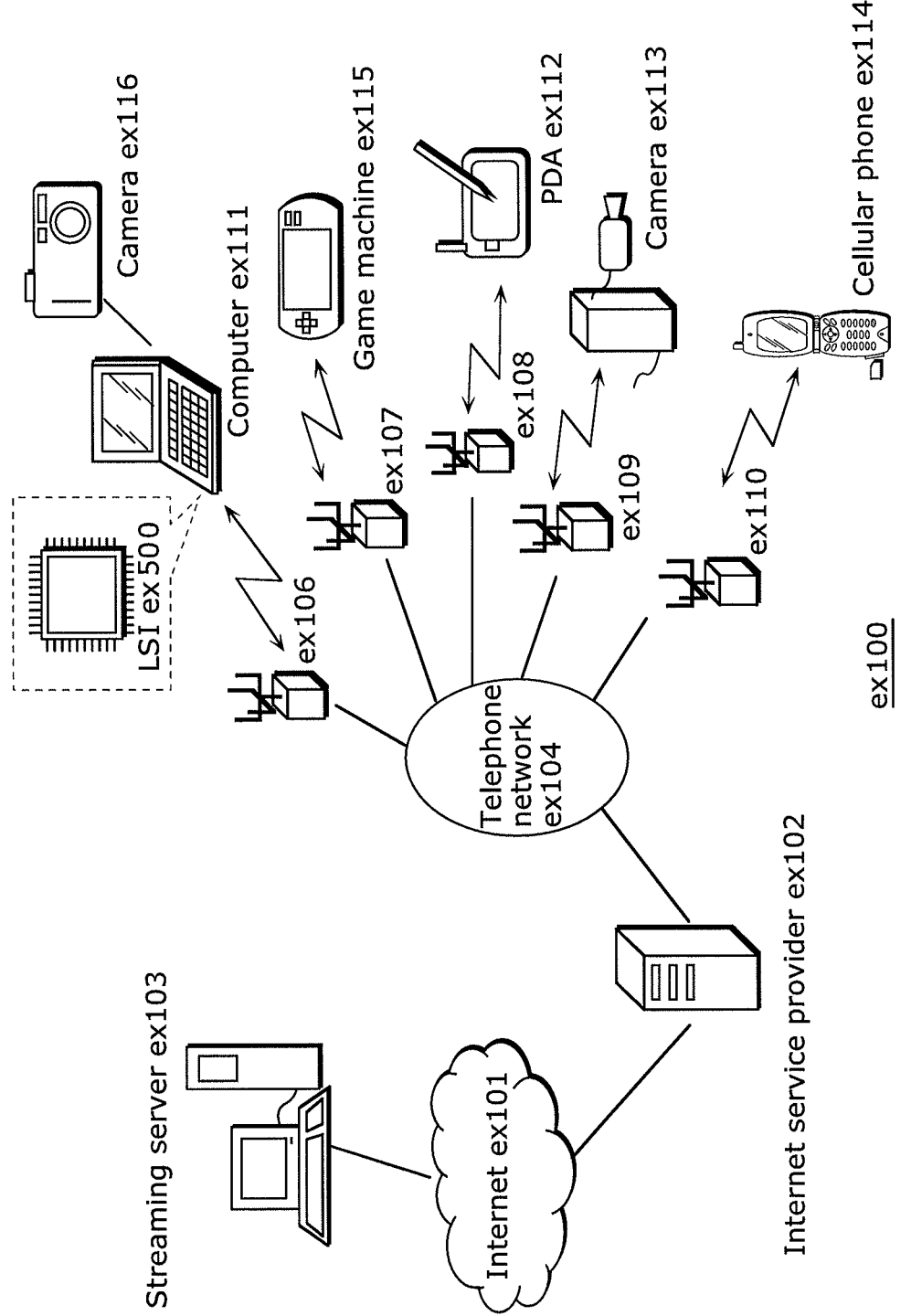
FIG. 15 illustrates an overall configuration of a content providing system for implementing content distribution services.

FIG. 15 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110.

However, the configuration of the content providing system ex100 is not limited to the configuration shown in FIG. 15, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in each of Embodiments, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (that is, functions as an image decoding apparatus according to the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding images may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the moving picture data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 16:
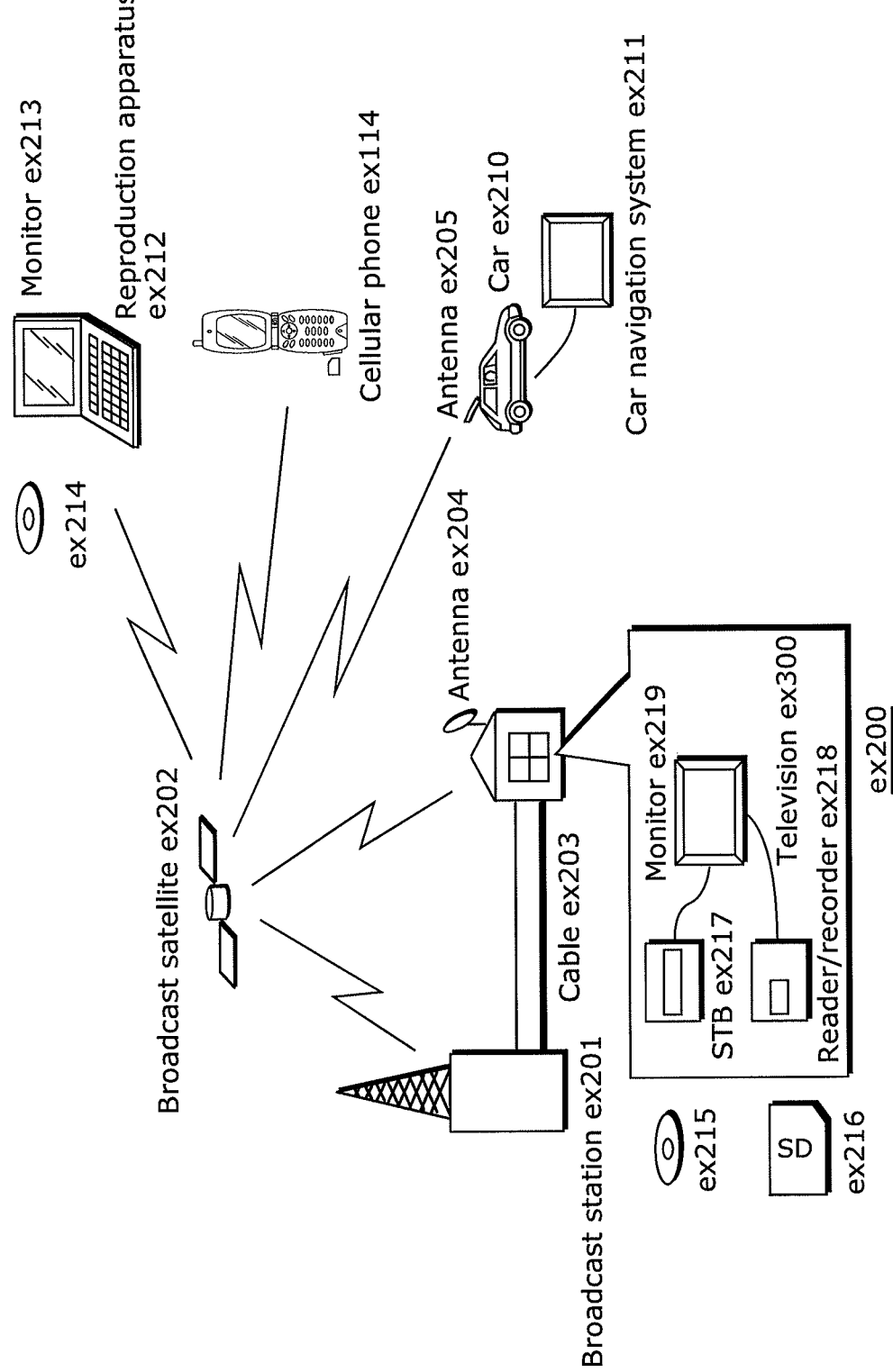
FIG. 16 illustrates an overall configuration of a digital broadcasting system.

Aside from the example of the content providing system ex100, at least one of the moving picture coding apparatus (image coding apparatus) and the moving picture decoding apparatus (image decoding apparatus) described in each of Embodiments may be implemented in a digital broadcasting system ex200 illustrated in FIG. 16. More specifically, a broadcast station ex201 communicates or transmits, via radio waves to a broadcast satellite ex202, multiplexed data obtained by multiplexing audio data and others onto video data. The video data is data coded by the moving picture coding method described in each of Embodiments (that is, data coded by the image coding apparatus according to the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data and reproduces the decoded data (that is, functions as the image decoding apparatus according to the present invention).

Furthermore, a reader/recorder ex218 that (i) reads and decodes the multiplexed data recorded on a recording media ex215, such as a DVD and a BD, or (ii) codes video signals in the recording medium ex215, and in some cases, writes data obtained by multiplexing an audio signal on the coded data can include the moving picture decoding apparatus or the moving picture coding apparatus as shown in each of Embodiments. In this case, the reproduced video signals are displayed on the monitor ex219, and can be reproduced by another device or system using the recording medium ex215 on which the multiplexed data is recorded. Furthermore, it is also possible to implement the image decoding apparatus in the set top box ex217 connected to the cable ex203 for a cable television or the antenna ex204 for satellite and/or terrestrial broadcasting, so as to display the video signals on the monitor ex219 of the television ex300. The moving picture decoding apparatus may be included not in the set top box but in the television ex300.

Figure 17:
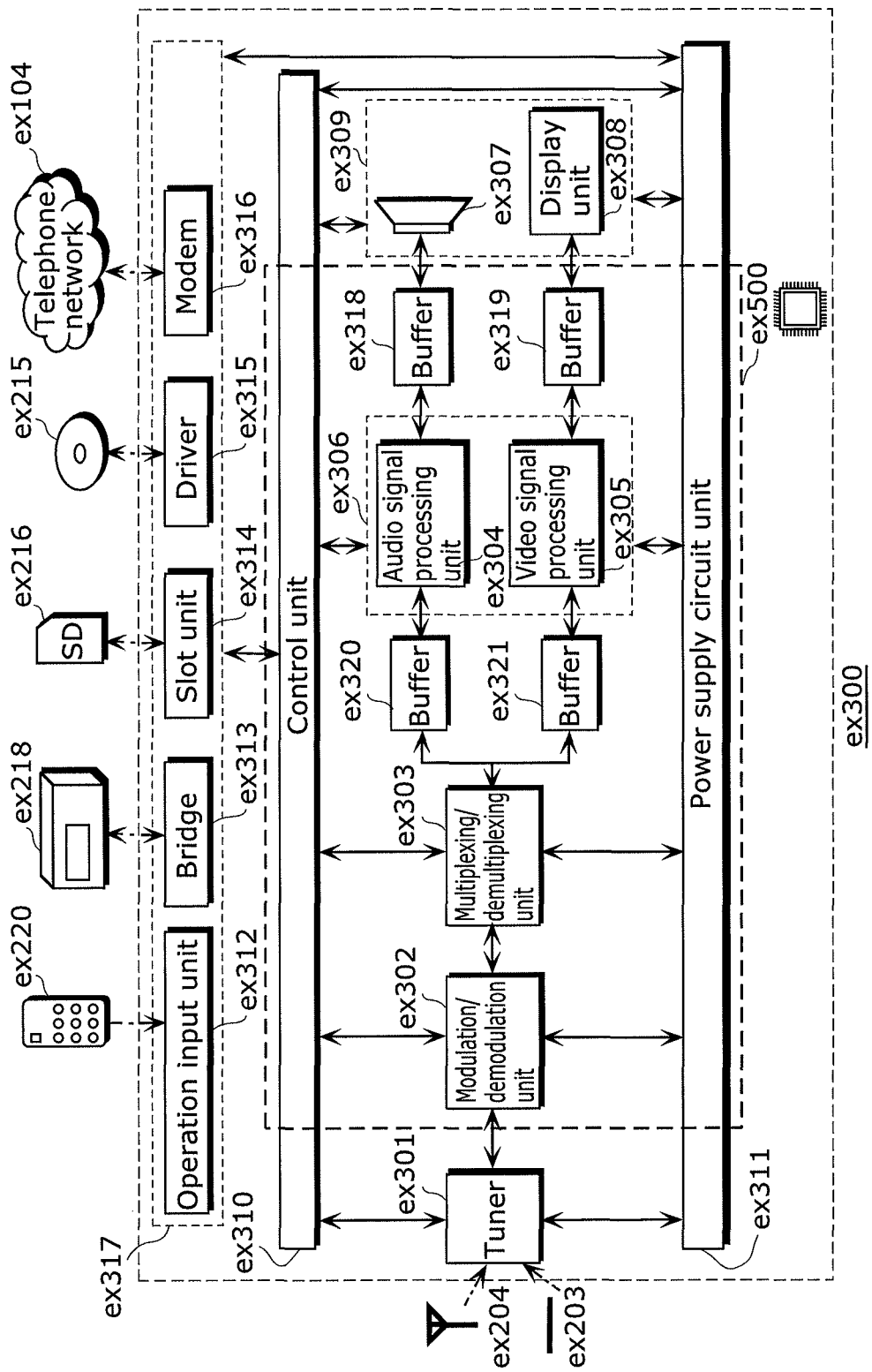
FIG. 17 illustrates a block diagram illustrating an example of a configuration of a television.

FIG. 17 illustrates the television (receiver) ex300 that uses the moving picture coding method and the moving picture decoding method described in each of Embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 (functioning as the image coding apparatus or the image decoding apparatus according to the present invention) that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to one another through a synchronous bus.

First, a configuration in which the television ex300 decodes data obtained from outside through the antenna ex204 and others and reproduces the decoded data will be described. In the television ex300, upon a user operation from a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments in the television ex300. The output unit ex309 provides the decoded video signal and audio signal outside. When the output unit ex309 provides the video signal and the audio signal, the signals may be temporarily stored in buffers ex318 and ex319, and others so that the signals are reproduced in synchronization with each other. Furthermore, the television ex300 may read a coded bitstream not through a broadcast and others but from the recording media ex215 and ex216, such as a magnetic disk, an optical disc, and an SD card. Next, a configuration in which the television ex300 codes an audio signal and a video signal, and transmits the data outside or writes the data on a recording medium will be described. In the television ex300, upon a user operation from the remote controller ex220 and others, the audio signal processing unit ex304 codes an audio signal, and the video signal processing unit ex305 codes a video signal, under control of the control unit ex310 using the coding method described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be not capable of performing all the processes but capable of only one of receiving, decoding, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 18:
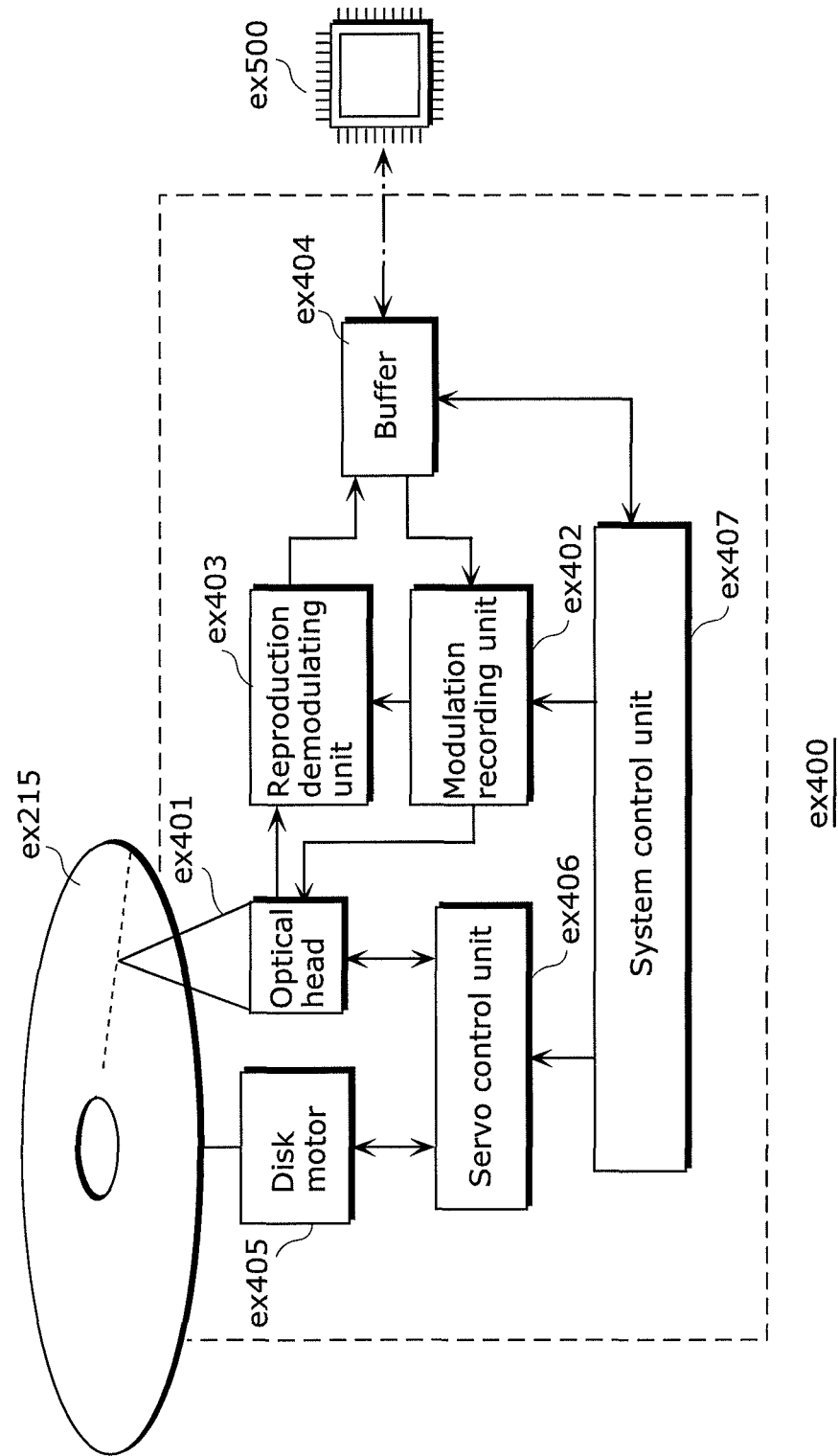
FIG. 18 illustrates a block diagram illustrating an example of a configuration of an information reproducing/recording unit that reads and writes information from or on a recording medium that is an optical disc.

As an example, FIG. 18 illustrates a configuration of an information reproducing/recording unit ex400 when data is read or written from or in an optical disc. The information reproducing/recording unit ex400 includes constituent elements ex401, ex402, ex403, ex404, ex405, ex406, and ex407 to be described hereinafter. The optical head ex401 irradiates a laser spot on a recording surface of the recording medium ex215 that is an optical disc to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 19:
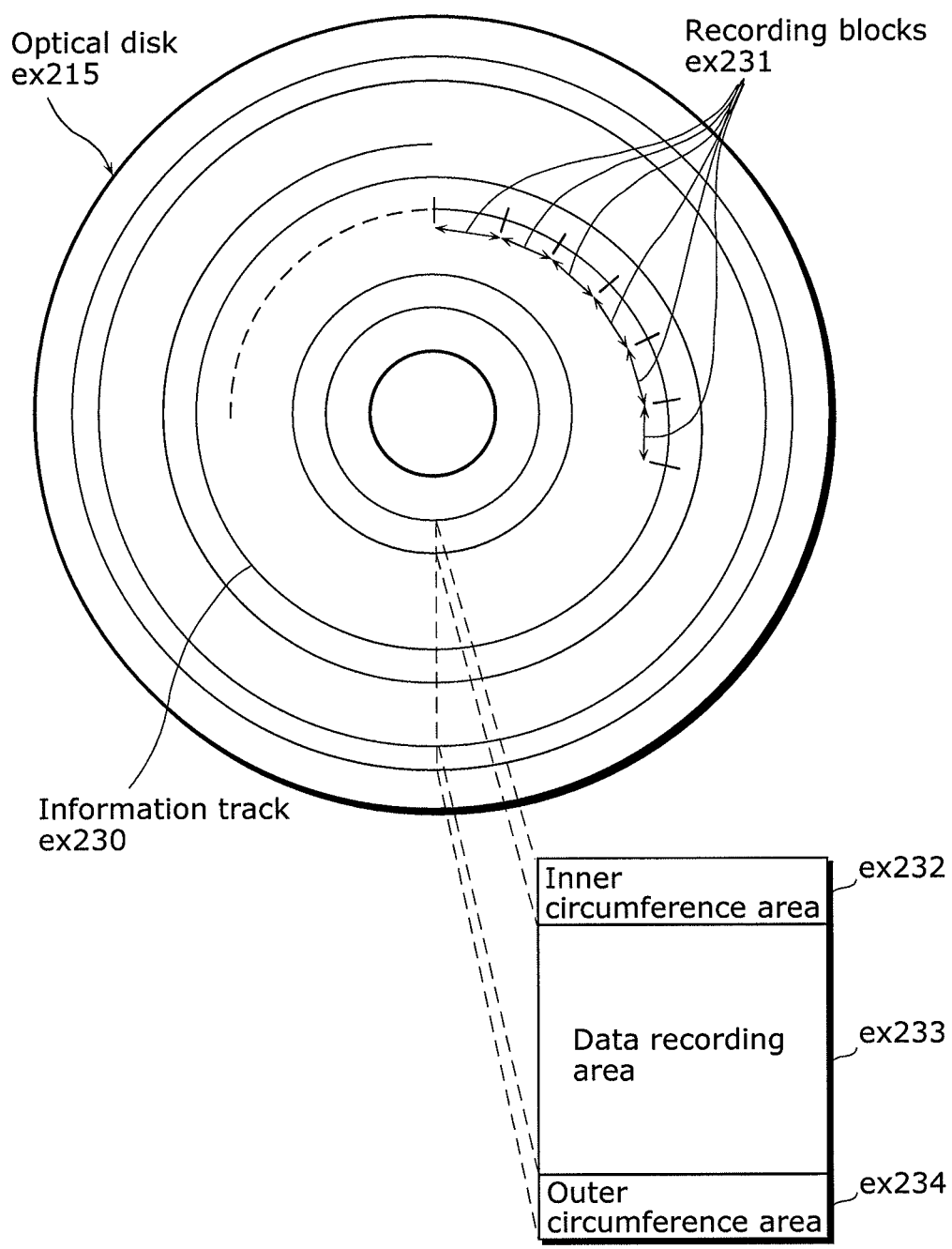
FIG. 19 illustrates an example of a configuration of a recording medium that is an optical disc.

FIG. 19 schematically illustrates the recording medium ex215 that is the optical disc. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit ex400 reads and writes coded audio data, coded video data, or coded data obtained by multiplexing the coded audio data and the coded video data, from and on the data recording area ex233 of the recording medium ex215.

Although an optical disc having a layer, such as a DVD and a BD is described as an example in the description, the optical disc is not limited to such, and may be an optical disc having a multilayer structure and capable of being recorded on a part other than the surface. Furthermore, the optical disc may have a structure for multidimensional recording/reproduction, such as recording of information using light of colors with different wavelengths in the same portion of the optical disc and recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be the one for example, including a GPS receiving unit in the configuration illustrated in FIG. 17. The same will be true for the configuration of the computer ex111, the cellular phone ex114, and others.

Figure 20A:
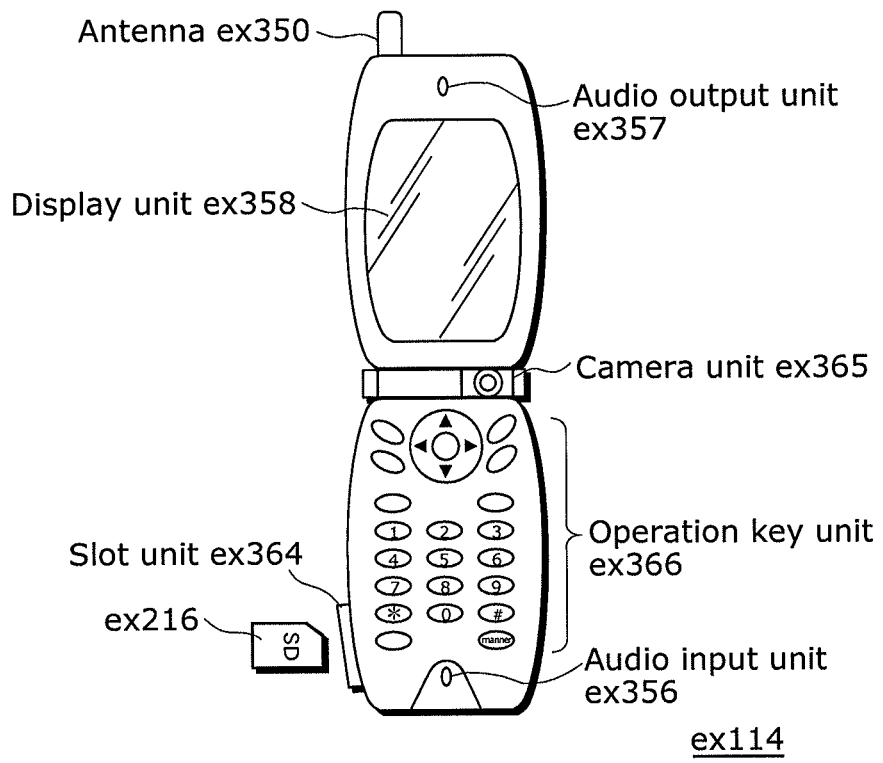
FIG. 20A illustrates an example of a cellular phone.

FIG. 20A illustrates the cellular phone ex114 that uses the moving picture coding method and the moving picture decoding method described in Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including a set of operation keys ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 20B:
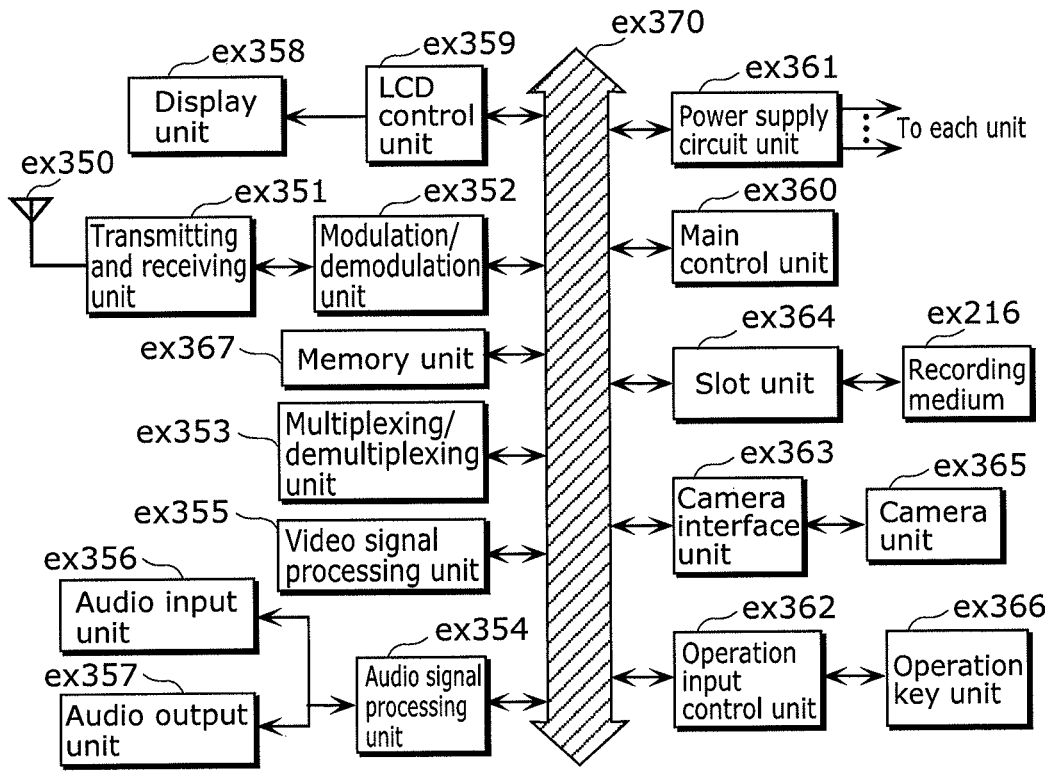
FIG. 20B illustrates an example of a configuration of the cellular phone.

Next, an example of a configuration of the cellular phone ex114 will be described with reference to FIG. 20B. In the cellular phone ex114, a main control unit ex360 designed to control overall each unit of the main body including the display unit ex358 as well as the operation keys ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key and a power key are turned ON by a user's operation, the power supply circuit unit ex360 supplies the respective units with power from a battery pack so as to activate the cell phone ex114 that is digital and is equipped with the camera.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex356.

Furthermore, when an e-mail in data communication mode is transmitted, text data of the e-mail inputted by operating the operation keys ex366 and others of the main body is sent out to the main control unit ex360 via the operation input control unit ex362. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of Embodiments (that is, functioning as the image coding apparatus according to the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the digital audio signals, and the transmitting and receiving unit ex351 performs digital-to-analog conversion and frequency conversion on the data, so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bitstream and an audio data bitstream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of Embodiments (that is, functioning as the image decoding apparatus according to the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 may have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of Embodiments can be used in any of the devices and systems described. Thus, the advantages described in each of Embodiments can be obtained.

Furthermore, the present invention is not limited to Embodiments, and various modifications and revisions are possible without departing from the scope of the present invention.

Embodiment 5

Video data can be generated by switching, as necessary, between (i) the moving picture coding method or the moving picture coding apparatus shown in each of Embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be identified, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of Embodiments will be hereinafter described. The multiplexed data is a digital stream in the MPEG2-Transport Stream format.

FIG. 21 illustrates a structure of the multiplexed data. As illustrated in FIG. 21, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of a movie. Here, the primary video is normal video to be displayed on a screen, and the secondary video is video to be displayed on a smaller window in the main video. Furthermore, the interactive graphics stream represents an interactive screen to be generated by arranging the GUI components on a screen. The video stream is coded in the moving picture coding method or by the moving picture coding apparatus shown in each of Embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 22:
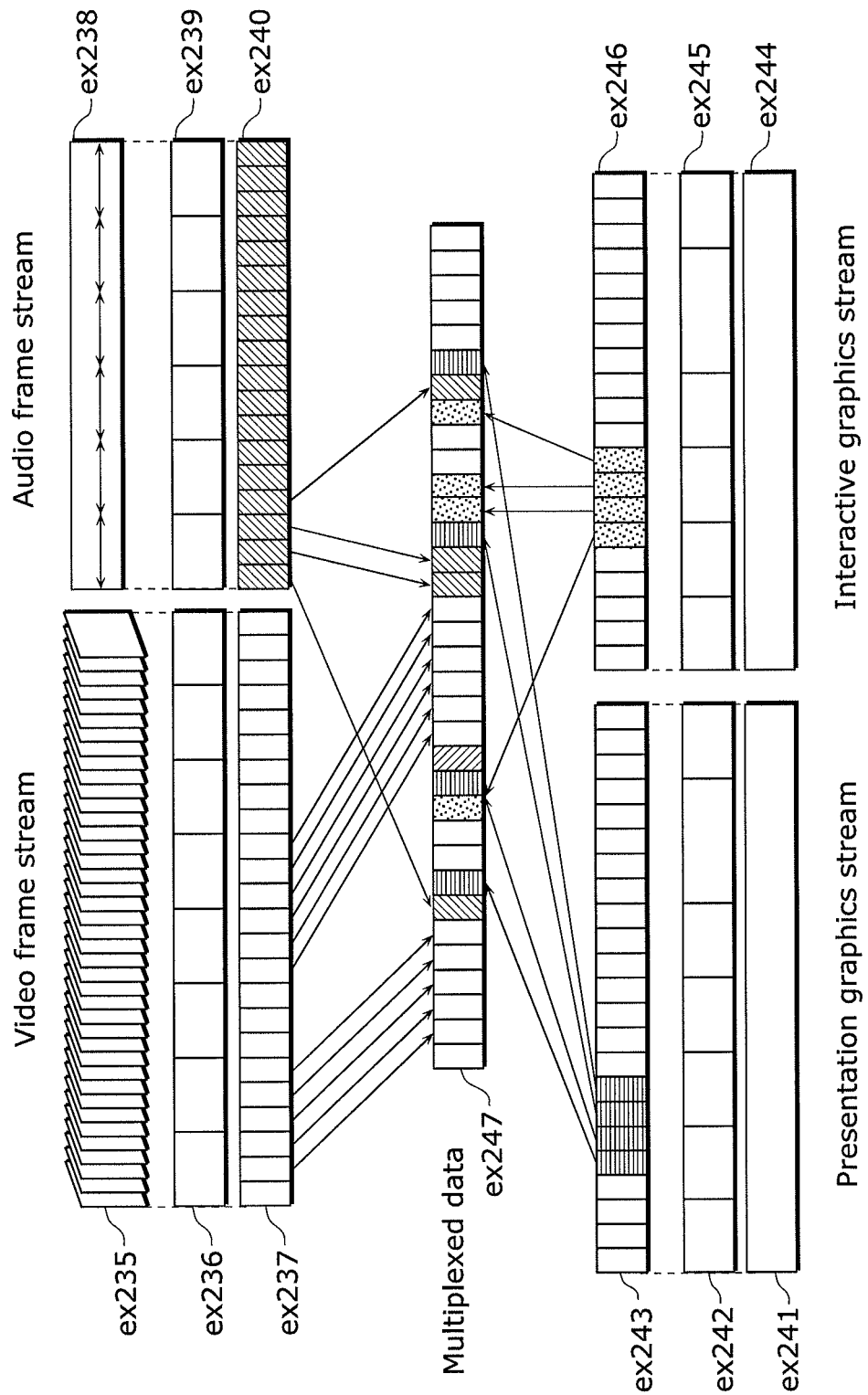
FIG. 22 schematically illustrates how each stream is multiplexed in the multiplexed data.

FIG. 22 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 23:
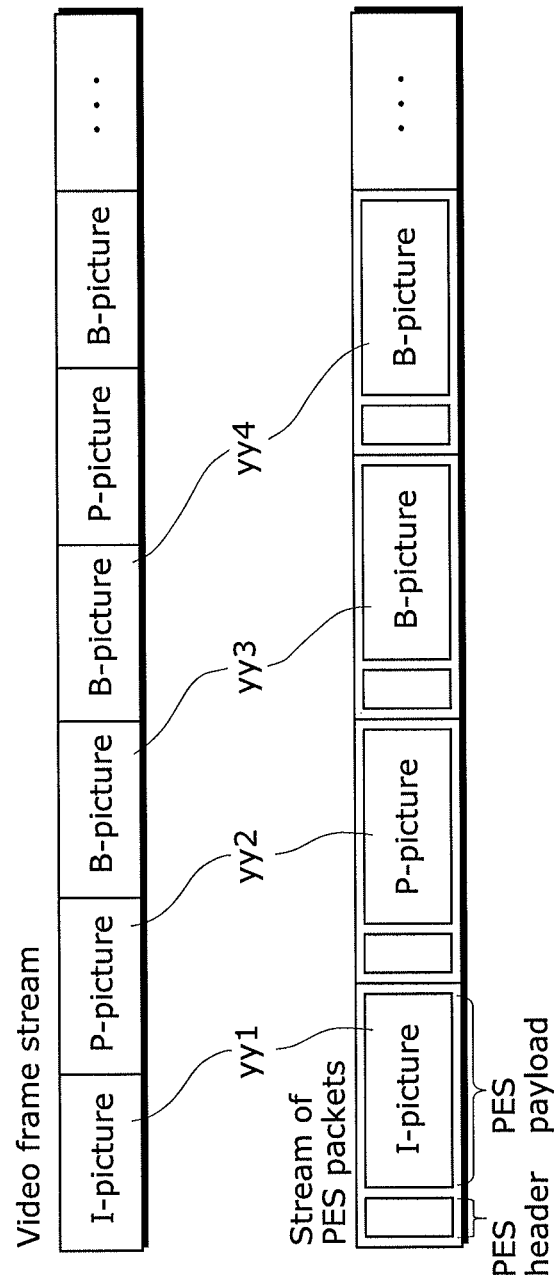
FIG. 23 illustrates how a video stream is stored in a stream of PES packets in more detail.

FIG. 23 illustrates how a video stream is stored in a stream of PES packets in more detail. The first bar in FIG. 23 shows a video frame stream in a video stream. The second bar shows the stream of PES packets. As indicated by arrows denoted as yy2, yy2, yy3, and yy4 in FIG. 23, the video stream is divided into pictures as I-pictures, B-pictures, and P-pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 24 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 24. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

FIG. 25 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 26:
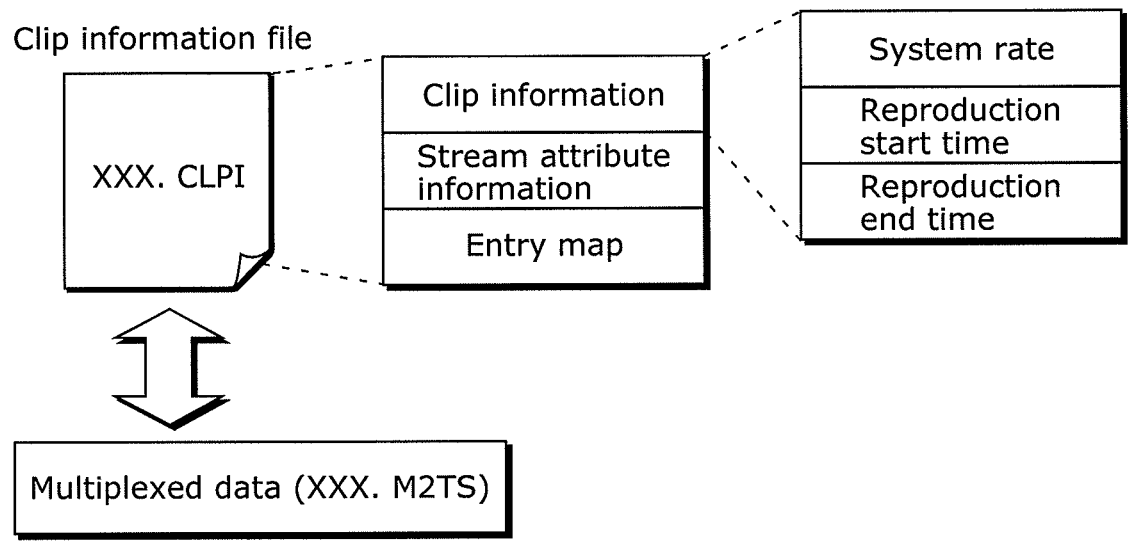
FIG. 26 illustrates an internal structure of multiplexed data information.

Each of the multiplexed data information files is management information of the multiplexed data as shown in FIG. 26. The multiplexed data information files are in one to one correspondence with the multiplexed data, and each of the files includes multiplexed data information, stream attribute information, and an entry map.

As illustrated in FIG. 26, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 27:
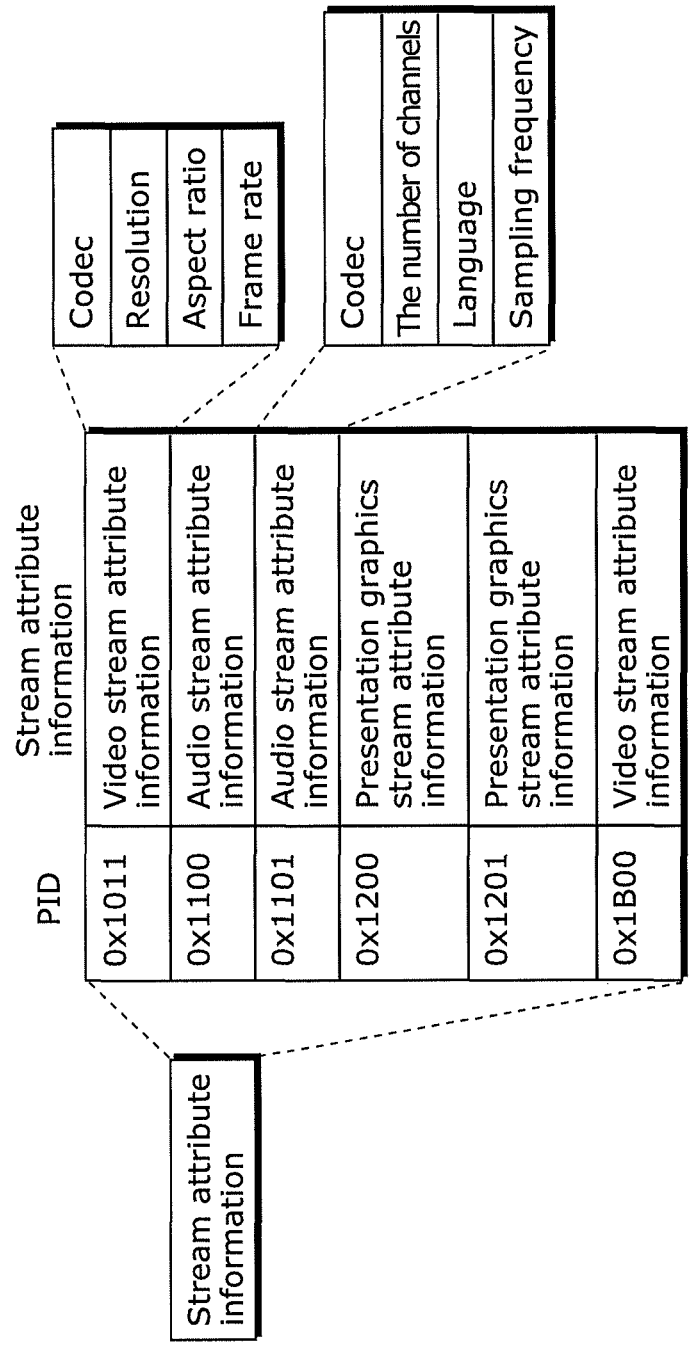
FIG. 27 illustrates an internal structure of stream attribute information.

As shown in FIG. 27, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In Embodiment 5, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of Embodiments includes a step or a unit for allocating unique information indicating video data generated by the moving picture coding method or the moving picture coding apparatus in each of Embodiments, to the stream type included in the PMT or the video stream attribute information. With the configuration, the video data generated by the moving picture coding method or the moving picture coding apparatus described in each of Embodiments can be distinguished from video data that conforms to another standard.

Figure 28:
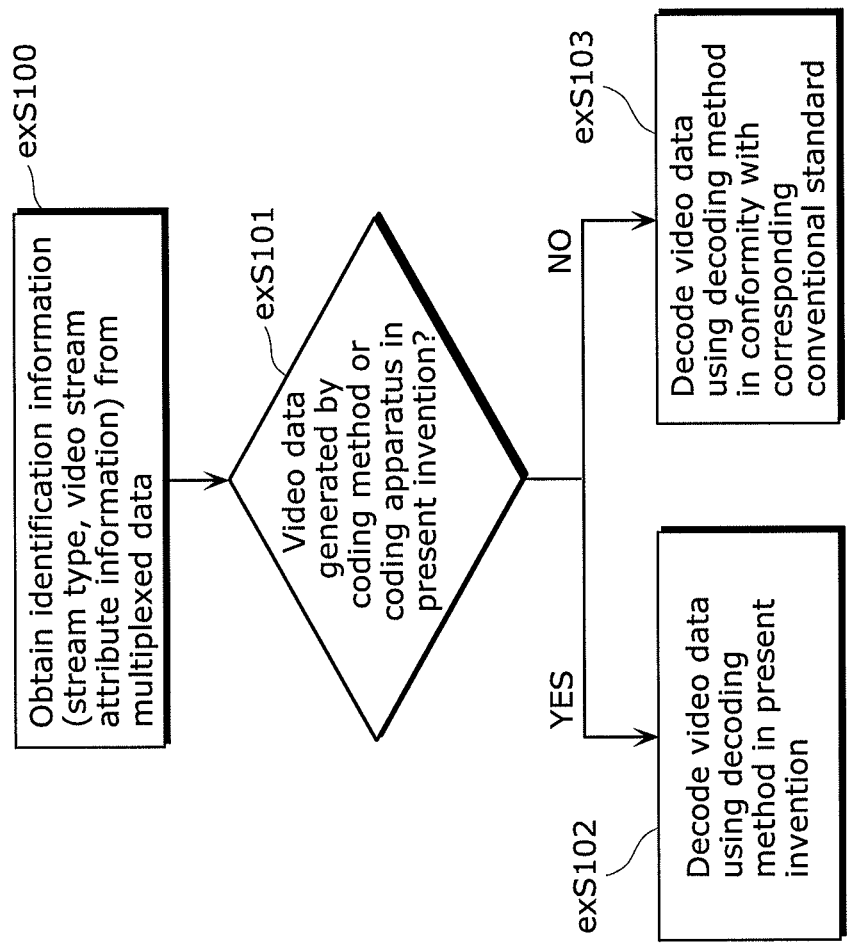
FIG. 28 illustrates steps for identifying video data.

Furthermore, FIG. 28 illustrates steps of the moving picture decoding method according to Embodiment 5. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of Embodiments. When it is determined that the stream type or the video stream attribute information indicates that the multiplexed data is generated by the moving picture coding method or the moving picture coding apparatus in each of Embodiments, in Step exS102, the stream type or the video stream attribute information is decoded by the moving picture decoding method in each of Embodiments. Furthermore, when the stream type or the video stream attribute information indicates conformance to the conventional standards, such as MPEG-2, MPEG-4 AVC, and VC-1, in Step exS103, the stream type or the video stream attribute information is decoded by a moving picture decoding method in conformity with the conventional standards.

As such, allocating a new unique value to the stream type or the video stream attribute information enables determination whether or not the moving picture decoding method or the moving picture decoding apparatus that is described in each of Embodiments can perform decoding. Even upon an input of multiplexed data that conforms to a different standard, an appropriate decoding method or apparatus can be selected. Thus, it becomes possible to decode information without any error. Furthermore, the moving picture coding method or apparatus, or the moving picture decoding method or apparatus in Embodiment 5 can be used in the devices and systems described above.

Embodiment 6

Figure 29:
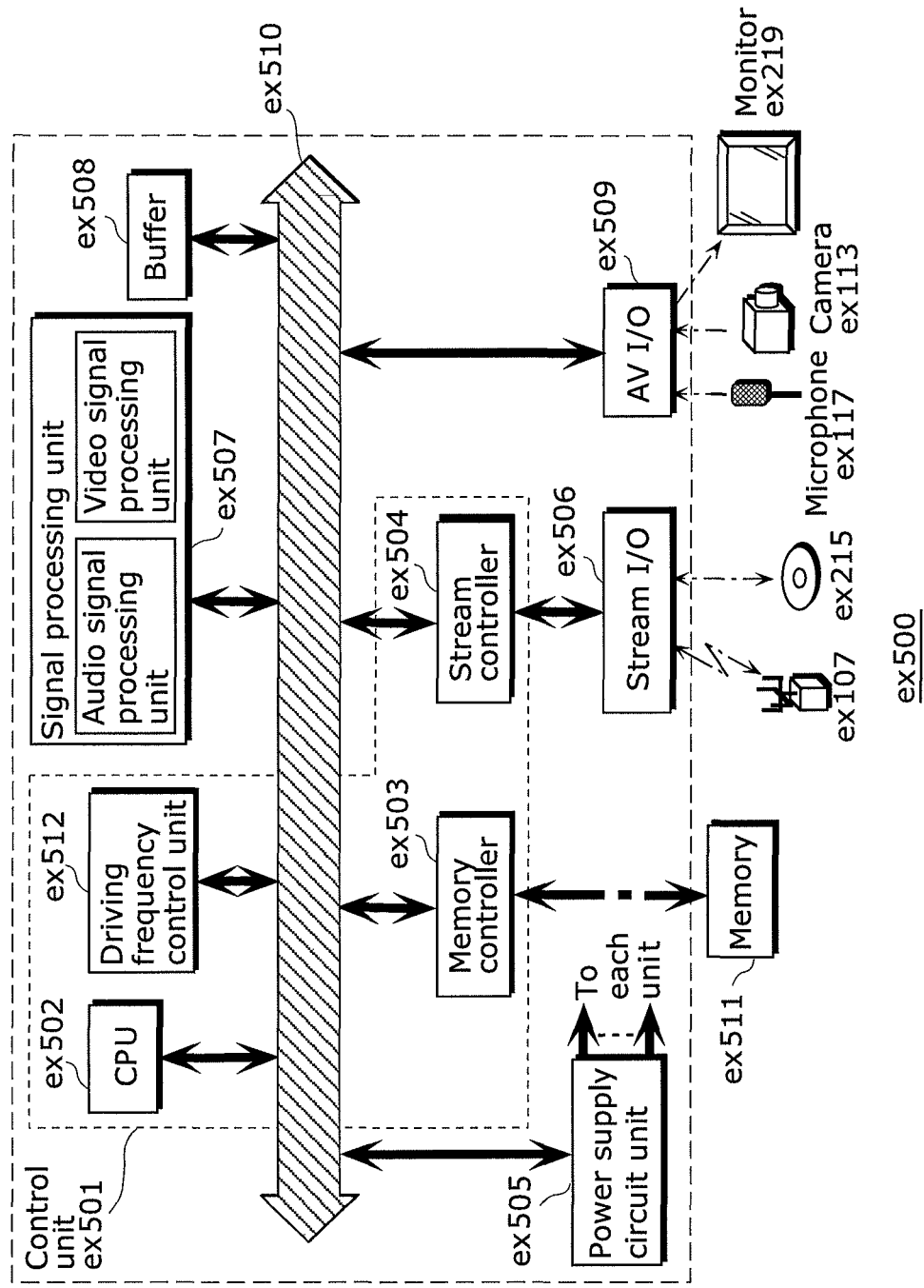
FIG. 29 illustrates a block diagram illustrating an example of a configuration of an integrated circuit for implementing a moving picture coding method and a moving picture decoding method according to each of Embodiments.

Each of the moving picture coding method, the moving picture coding apparatus, the moving picture decoding method, and the moving picture decoding apparatus in each of Embodiments is typically achieved in the form of an integrated circuit or a Large Scale Integrated (LSI) circuit. As an example of the LSI, FIG. 29 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the computing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data sets should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 7

When video data is decoded in the moving picture coding method or by the moving picture coding apparatus described in each of Embodiments, compared to when video data that conforms to a conventional standard, such as MPEG-2, MPEG-4 AVC, and VC-1, the computing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 30:
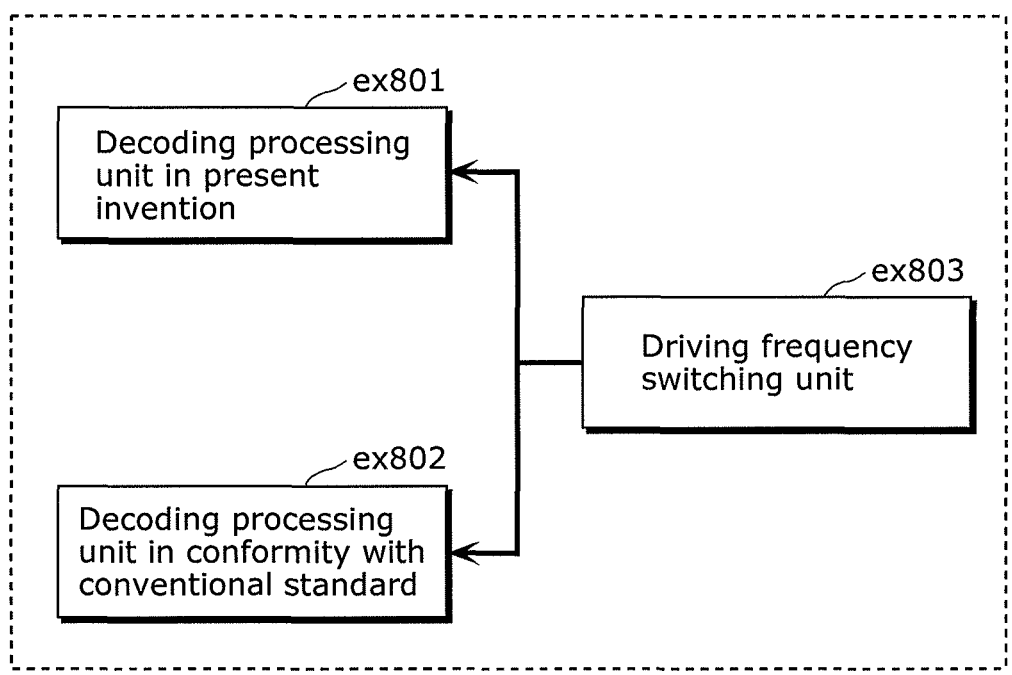
FIG. 30 illustrates a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 30 illustrates a configuration ex800 in Embodiment 7. A driving frequency switching unit ex803 sets a driving frequency to a higher driving frequency when video data is generated by the moving picture coding method or the moving picture coding apparatus described in each of Embodiments. Then, the driving frequency switching unit ex803 instructs a decoding processing unit ex801 that executes the moving picture decoding method described in each of Embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of Embodiments. Then, the driving frequency switching unit ex803 instructs the decoding processing unit ex802 that conforms to the conventional standard to decode the video data.

Figures 32, 33A:
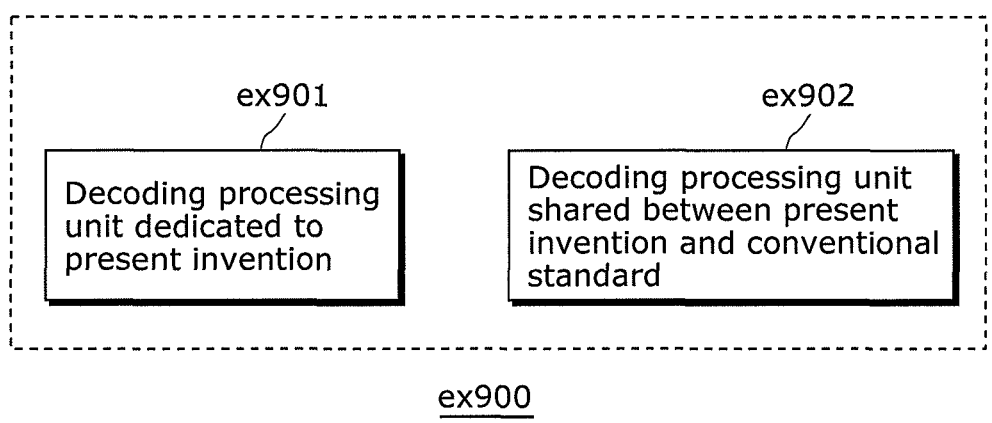
FIG. 32 illustrates an example of a look-up table in which the standards of video data are associated with the driving frequencies.
FIG. 33A illustrates an example of a configuration for sharing a module of a signal processing unit.

More specifically, the driving frequency switching unit ex803 includes the CPU ex502 and the driving frequency control unit ex582 in FIG. 29. Here, each of the decoding processing unit ex802 that executes the moving picture decoding method described in each of Embodiments and the decoding processing unit ex802 that conforms to the conventional standard corresponds to the signal processing unit ex507 in FIG. 29. The CPU ex502 determines to which standard the video data conforms. Then, the driving frequency control unit ex512 determines a driving frequency based on a signal from the CPU ex502. Furthermore, the signal processing unit ex507 decodes the video data based on a signal from the CPU ex502. For example, the identification information described in Embodiment 7 is probably used for identifying the video data. The identification information is not limited to the one described in Embodiment 7 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 32. The driving frequency can be selected by storing the look-up table in the buffer ex508 and an internal memory of an LSI and with reference to the look-up table by the CPU ex502.

Figure 31:
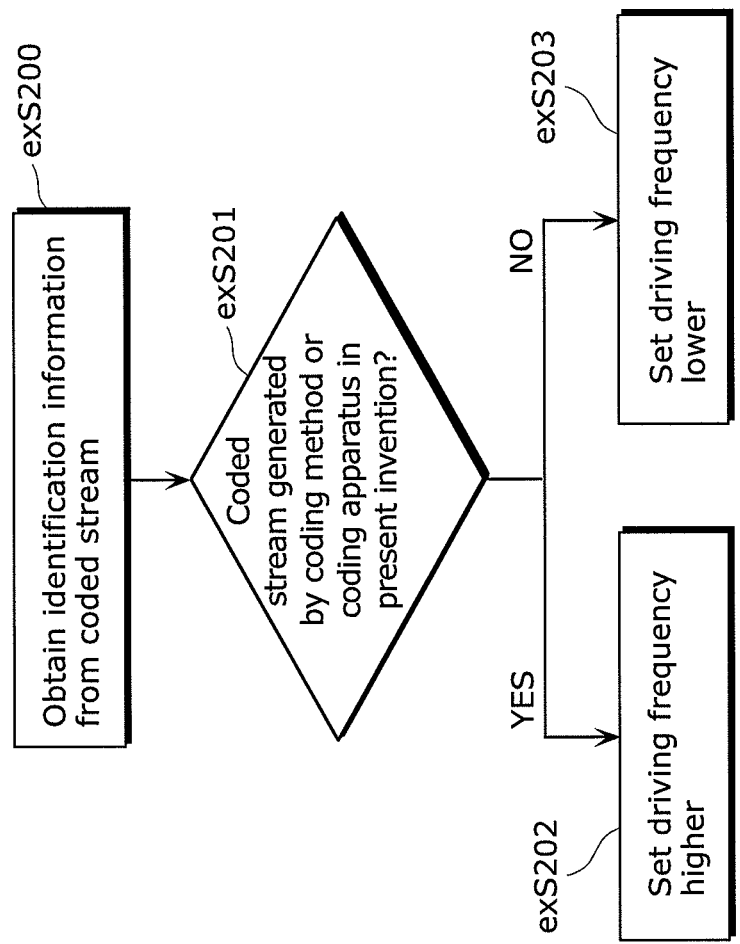
FIG. 31 illustrates steps for identifying video data and switching between driving frequencies.

FIG. 31 illustrates steps for executing a method in Embodiment 7. First, in Step exS200, the signal processing unit ex507 obtains identification information from the multiplexed data. Next, in Step exS201, the CPU ex502 determines whether or not the video data is generated based on the identification information by the coding method and the coding apparatus described in each of Embodiments. When the video data is generated by the coding method and the coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the coding method and the coding apparatus described in each of Embodiments.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the computing amount for decoding is larger, the driving frequency may be set higher, and when the computing amount for decoding is smaller, the driving frequency may be set lower as the method for setting the driving frequency. Thus, the setting method is not limited to the ones described above. For example, when the computing amount for decoding video data in conformity with MPEG-4 AVC is larger than the computing amount for decoding video data generated by the moving picture coding method and the moving picture coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of Embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of Embodiments, in the case where the CPU ex502 may have a time delay, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 8

There are cases where a plurality of video data that conforms to a different standard, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of Embodiments and the decoding processing unit that conforms to the conventional standard, such as MPEG-2, MPEG-4 AVC, and VC-1 are partly shared. Ex900 in FIG. 33A shows an example of the configuration. For example, the moving picture decoding method described in each of Embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to the present invention. Since the present invention is characterized by motion compensation in particular, for example, the dedicated decoding processing unit ex901 is used for the motion compensation. Otherwise, the decoding processing unit is probably shared for one of the entropy coding, inverse quantization, deblocking filtering, and inverse quantization, or all of the processing. The decoding processing unit for implementing the moving picture decoding method described in each of Embodiments may be shared for the processing to be shared, and a dedicated decoding processing unit may be used for processing unique to that of MPEG-4 AVC.

Figure 33B:
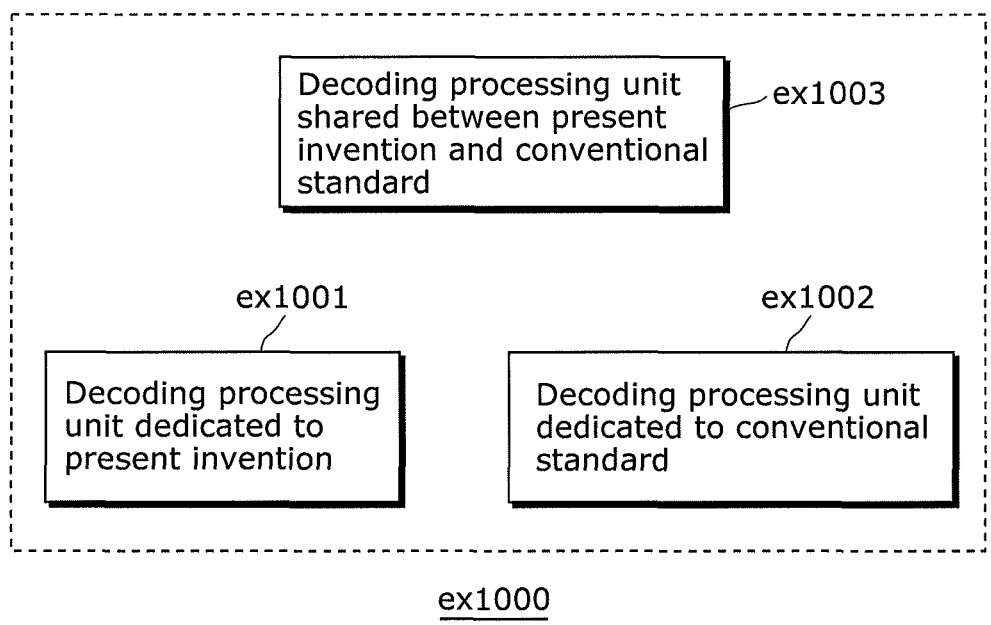
FIG. 33B illustrates another example of a configuration for sharing a module of a signal processing unit.

Furthermore, ex1000 in FIG. 33B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the moving picture decoding method in the present invention and the conventional moving picture decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration of Embodiment 8 can be implemented by the LSI ex500.

As such, reducing the scale of the circuit of an LSI and reducing the cost are possible by sharing the decoding processing unit for the processing to be shared between the moving picture decoding method in the present invention and the moving picture decoding method in conformity with the conventional standard.

INDUSTRIAL APPLICABILITY

The present invention is applicable as a moving picture coding method, a moving picture decoding method, a moving picture coding apparatus, and a moving picture decoding apparatus. The present invention is applicable to, for example, information display apparatuses and image-capturing apparatuses, such as televisions, digital video recorders, car navigation systems, mobile phones, digital cameras, and digital video cameras.

REFERENCE SIGNS LIST

100 Moving picture coding apparatus
101 Subtractor
102 Orthogonal transform unit
103 Quantization unit
104, 204 Inverse quantization unit
105, 205 Inverse orthogonal transform unit
106, 206 Adder
107, 207 Block memory
108, 208 Frame memory
109, 209 Intra prediction unit
110, 210 Inter prediction unit
111, 211 Switch
112, 212 Inter prediction control unit
113 Picture type determining unit
114, 214 Temporal direct vector calculating unit
115 Co-located reference direction determining unit 116 Variable length coding unit
150 Input image sequence
151 Difference image
152, 154, 254 Coefficient block
153, 253 Quantized coefficients
155, 255 Decoded difference image
156 Decoded image
159, 160, 161, 259, 260, 261 Predicted image
162, 262 Motion vector predictor index
163, 263 Picture type information
165, 265 Co-located reference direction flag
166, 266 Bitstream
200 Moving picture decoding apparatus
216 Variable length decoding unit
256 Decoded image sequence

The invention claimed is:

1. A moving picture coding method for coding a current block included in a current picture to be coded, the moving picture coding method comprising:

calculating, using a processor, a first motion vector predictor candidate that is a candidate for a motion vector for the current block by scaling a reference motion vector of a first block included in a first picture different from the current picture, the first block being co-located, in the first picture, with the current block;

calculating a motion vector for an adjacent block adjacent to the current block as a second motion vector prediction candidate that is a candidate for the motion vector for the current block;

determining a value of an index for each of a plurality of motion vector predictor candidates including the first motion vector predictor candidate and the second motion vector predictor candidate;

selecting a motion vector predictor from among the plurality of motion vector predictor candidates;

coding the current block using the selected motion vector predictor; and generating a coded stream including the coded current block and the value of the index allocated to the selected motion vector predictor, wherein the value of the index for the first motion vector predictor candidate is determined according to (i) a first order of the current picture and the first picture and (ii) a second order of the first picture and a picture to which the reference motion vector of the first block points, when a direction of the reference motion vector of the first block is the same as a direction from the first picture to the current picture, the value of the index for the first motion vector predictor candidate is determined to be smaller than the value of the index for the second motion vector predictor candidate, and when the direction of the reference motion vector of the first block is different from the direction from the first picture to the current picture, the value of the index for the first motion vector predictor candidate is determined to be larger than the value of the index for the second motion vector predictor candidate.

2. The moving picture coding method according to claim 1, wherein when the first picture precedes the current picture in display order, the first motion vector predictor candidate is calculated by scaling a reference motion vector for the first block for referencing the backward direction in the display order, and when the first picture follows the current picture in the display order, the first motion vector predictor candidate is calculated by scaling a reference motion vector for the first block for referencing the forward direction in the display order.

3. The moving picture coding method according to claim 1, further comprising:

selecting a motion vector predictor candidate having a smallest difference with a predetermined motion vector, from among motion vector predictor candidates including the first motion vector predictor candidate and the second motion vector predictor candidate; and coding the current block using the predetermined motion vector, and coding (i) a difference value between the selected motion vector predictor candidate and the predetermined motion vector and (ii) information for identifying the selected motion vector predictor candidate, wherein the predetermined motion vector is a motion vector calculated by motion estimation.

4. The moving picture coding method according to claim 3, wherein the information for identifying the selected motion vector predictor candidate is the index, and when the index is coded, in the coding, a code sequence of the index is longer as a value of the index is larger.

5. A moving picture decoding method for decoding a current block included in a current picture to be decoded, the moving picture decoding method comprising:

calculating, using a processor, a first motion vector predictor candidate that is a candidate for a motion vector for the current block by scaling a reference motion vector of a first block included in a first picture different from the current picture, the first block being co-located, in the first picture, with the current block;

calculating a motion vector for an adjacent block adjacent to the current block as a second motion vector prediction candidate that is a candidate for the motion vector for the current block;

determining a value of an index for each of a plurality of motion vector predictor candidates including the first motion vector predictor candidate and the second motion vector predictor candidate;

selecting, from among the plurality of motion vector predictor candidates, a motion vector predictor candidate to which the value of the index identical to a value of an index included in a coded stream is allocated, as a motion vector predictor; and decoding the current block using the selected motion vector predictor, wherein a value of an index for the first motion vector predictor candidate is determined according to (i) a first order of the current picture and the first picture and (ii) a second order of the first picture and a picture to which the reference motion vector of the first block points, when a direction of the reference motion vector of the first block is the same as a direction from the first picture to the current picture, the value of the index for the first motion vector predictor candidate is determined to be smaller than the value of the index for the second motion vector predictor candidate, and when the direction of the reference motion vector of the first block is different from the direction from the first picture to the current picture, the value of the index for the first motion vector predictor candidate is determined to be larger than the value of the index for the second motion vector predictor candidate.

6. The moving picture decoding method according to claim 5, wherein when the first picture precedes the current picture in display order, the first motion vector prediction candidate is calculated by scaling a reference motion vector for the first block for referencing the backward direction in the display order, and when the first picture follows the current picture in the display order, the first motion vector prediction candidate is calculated by scaling a reference motion vector for the first block for referencing the forward direction in the display order.

7. A moving picture coding apparatus that codes a current block included in a current picture to be coded, the moving picture coding apparatus comprising:

a first calculating unit configured to calculate a first motion vector predictor candidate that is a candidate for a motion vector for the current block by scaling a reference motion vector of a first block included in a first picture different from the current picture, the first block being co-located, in the first picture, with the current block;

a second calculating unit configured to calculate a motion vector for an adjacent block adjacent to the current block as a second motion vector prediction candidate that is a candidate for the motion vector for the current block;

a determining unit configured to determine a value of an index for each of a plurality of motion vector predictor candidates including the first motion vector predictor candidate and the second motion vector predictor candidate;

a control unit configured to select a motion vector predictor from among the plurality of motion vector predictor candidates;

a coding unit configured to (i) code the current block using the selected motion vector predictor and (ii) generate a coded stream including the coded current block and the value of the index allocated to the selected motion vector predictor, wherein the value of the index for the first motion vector predictor candidate is determined according to (i) a first order of the current picture and the first picture and (ii) a second order of the first picture and a picture to which the reference motion vector of the first block points, when a direction of the reference motion vector of the first block is the same as a direction from the first picture to the current picture, the value of the index for the first motion vector predictor candidate is determined to be smaller than the value of the index for the second motion vector predictor candidate, and when the direction of the reference motion vector of the first block is different from the direction from the first picture to the current picture, the value of the index for the first motion vector predictor candidate is determined to be larger than the value of the index for the second motion vector predictor candidate.

8. A moving picture decoding apparatus that decodes a current block included in a current picture to be decoded, the moving picture decoding apparatus comprising:

a first calculating unit configured to calculate a first motion vector predictor candidate that is a candidate for a motion vector for the current block by scaling a reference motion vector of a first block included in a first picture different from the current picture, the first block being co-located, in the first picture, with the current block;

a second calculating unit configured to calculate a motion vector for an adjacent block adjacent to the current block as a second motion vector prediction candidate that is a candidate for the motion vector for the current block;

a determining unit configured to determine a value of an index for each of a plurality of motion vector predictor candidates including the first motion vector predictor candidate and the second motion vector predictor candidate;

a control unit configured to select, from among the plurality of motion vector predictor candidates, a motion vector predictor candidate to which the value of the index identical to a value of an index included in a coded stream is allocated, as a motion vector predictor; and a decoding unit configured to decode the current block using the selected motion vector predictor, wherein the value of the index for the first motion vector predictor candidate is determined according to (i) a first order of the current picture and the first picture and (ii) a second order of the first picture and a picture to which the reference motion vector of the first block points, when a direction of the reference motion vector of the first block is the same as a direction from the first picture to the current picture, the value of the index for the first motion vector predictor candidate is determined to be smaller than the value of the index for the second motion vector predictor candidate, and when the direction of the reference motion vector of the first block is different from the direction from the first picture to the current picture, the value of the index for the first motion vector predictor candidate is determined to be larger than the value of the index for the second motion vector predictor candidate.

9. The moving picture coding method according to claim 1, wherein, when the first motion vector predictor candidate is selected as the selected motion vector predictor from among the plurality of motion vector predictor candidates, the value of the index for the first motion vector predictor candidate is included in the generated coded stream, the index for the first motion vector predictor candidate being determined according to (i) a first order of the current picture and the first picture and (ii) a second order of the first picture and a picture to which the reference motion vector of the first block points.

10. The moving picture decoding method according to claim 5, wherein, when the first motion vector predictor candidate is selected as the selected motion vector predictor from among the plurality of motion vector predictor candidates, the value of the index for the first motion vector predictor candidate is obtained from a coded stream including the current block, the index for the first motion vector predictor candidate being determined according to (i) a first order of the current picture and the first picture and (ii) a second order of the first picture and a picture to which the reference motion vector of the first block points.

11. The moving picture coding apparatus according to claim 7, wherein, when the first motion vector predictor candidate is selected as the selected motion vector predictor from among the plurality of motion vector predictor candidates, the value of the index for the first motion vector predictor candidate is included in the generated coded stream, the index for the first motion vector predictor candidate being determined according to (i) a first order of the current picture and the first picture and (ii) a second order of the first picture and a picture to which the reference motion vector of the first block points.

12. The moving picture decoding apparatus according to claim 8, wherein, when the first motion vector predictor candidate is selected as the selected motion vector predictor from among the plurality of motion vector predictor candidates, the value of the index for the first motion vector predictor candidate is obtained from a coded stream including the current block, the index for the first motion vector predictor candidate being determined according to (i) a first order of the current picture and the first picture and (ii) a second order of the first picture and a picture to which the reference motion vector of the first block points.

* * * * *

UNITED STATES PATENT AND TRADEMARK OFFICE
CERTIFICATE OF CORRECTION

PATENT NO. : 10,404,998 B2  
APPLICATION NO. : 13/985315  
DATED : September 3, 2019  
INVENTOR(S) : Toshiyasu Sugio Page 1 of 1

It is certified that error appears in the above-identified patent and that said Letters Patent is hereby corrected as shown below:

On the Title Page

Insert --Related U.S. Application Data  
(60) Provisional Application No. 61/445,121, filed on Feb. 22, 2011.--

Signed and Sealed this  
Twenty-eighth Day of January, 2020

Andrei Iancu  
*Director of the United States Patent and Trademark Office*